(12) United States Patent
Sato et al.

(10) Patent No.: US 10,215,147 B2
(45) Date of Patent: Feb. 26, 2019

(54) POWER TRANSMISSION APPARATUS WITH ROTATING ELECTRICAL MACHINE

(71) Applicant: EXEDY CORPORATION, Neyagawa-shi, Osaka (JP)

(72) Inventors: Keiji Sato, Neyagawa (JP); Hitoshi Katsura, Neyagawa (JP); Yoshihiro Matsuoka, Neyagawa (JP); Kohsuke Murata, Neyagawa (JP); Taichi Kitamura, Neyagawa (JP)

(73) Assignee: EXEDY CORPORATION, Neyagawa-shi (JP)

(*) Notice: Subject to any disclaimer, the term of this patent is extended or adjusted under 35 U.S.C. 154(b) by 0 days.

(21) Appl. No.: 15/419,202

(22) Filed: Jan. 30, 2017

(65) Prior Publication Data

US 2017/0218910 A1     Aug. 3, 2017

(30) Foreign Application Priority Data

Feb. 2, 2016   (JP) .................. 2016-017849

(51) Int. Cl.
| | |
|---|---|
| *F02N 11/08* | (2006.01) |
| *H02P 6/32* | (2016.01) |
| *H02P 25/03* | (2016.01) |
| *F02N 11/04* | (2006.01) |
| *H02K 1/22* | (2006.01) |
| *H02K 7/10* | (2006.01) |
| *H02K 7/20* | (2006.01) |

(52) U.S. Cl.
CPC .......... *F02N 11/0859* (2013.01); *F02N 11/04* (2013.01); *H02K 1/226* (2013.01); *H02K 7/10* (2013.01); *H02K 7/20* (2013.01); *H02P 6/32* (2016.02); *H02P 25/03* (2016.02)

(58) Field of Classification Search
CPC ........ F02N 11/0859; F02N 11/04; H02P 6/32; H02P 25/03; H02K 1/226; H02K 7/10; H02K 7/20
See application file for complete search history.

(56) References Cited

U.S. PATENT DOCUMENTS

| | | | | |
|---|---|---|---|---|
| 3,543,873 A | * | 12/1970 | Toy .................. | F16H 41/04 180/305 |
| 6,208,036 B1 | * | 3/2001 | Evans ................ | B60K 6/485 180/65.265 |

(Continued)

FOREIGN PATENT DOCUMENTS

| | | |
|---|---|---|
| JP | 2009-508464 A | 2/2009 |
| JP | 4782348 B2 | 9/2011 |
| JP | 4787242 B2 | 10/2011 |

*Primary Examiner* — Viet Nguyen
(74) *Attorney, Agent, or Firm* — Oliff PLC

(57) ABSTRACT

A power transmission apparatus, which is disposed on a power transmission path from an output shaft of an internal combustion engine to a transmission in a vehicle, is provided with a rotating electrical machine including a rotor and a stator. The rotor is coupled to a synchronous rotating member that rotates synchronously with the output shaft of the internal combustion engine, and takes a central axis of the output shaft of the internal combustion engine as a rotating shaft. The stator is fixed to a fixing member on a non-rotating side with respect to the synchronous rotating member, and faces the rotor with a first gap therebetween.

9 Claims, 24 Drawing Sheets

(56) References Cited

U.S. PATENT DOCUMENTS

| | | | | |
|---|---|---|---|---|
| 6,906,479 | B2* | 6/2005 | Xu | F02C 7/268 |
| | | | | 290/8 |
| 8,008,791 | B2* | 8/2011 | Yamakado | B60K 6/48 |
| | | | | 180/242 |
| 8,866,449 | B1* | 10/2014 | Rozman | H02P 9/302 |
| | | | | 322/46 |
| 2002/0158523 | A1 | 10/2002 | Abadia et al. | |
| 2006/0017290 | A1* | 1/2006 | Murty | F02N 11/04 |
| | | | | 290/36 R |
| 2008/0093850 | A1* | 4/2008 | Taneja | F01D 15/10 |
| | | | | 290/36 R |
| 2009/0184601 | A1 | 7/2009 | Dubus et al. | |
| 2011/0057459 | A1* | 3/2011 | Piccolo | B63H 21/20 |
| | | | | 290/1 R |
| 2012/0104767 | A1* | 5/2012 | Gibson | F02N 11/0866 |
| | | | | 290/36 R |
| 2014/0055102 | A1* | 2/2014 | Gibson | B60L 1/003 |
| | | | | 322/7 |
| 2016/0123174 | A1* | 5/2016 | Ettridge | F02N 11/04 |
| | | | | 290/46 |

* cited by examiner

CONVENTIONAL ART

POWER TRANSMISSION APPARATUS WITH ROTATING ELECTRICAL MACHINE

BACKGROUND ART

Technical Field

The present disclosure relates to a power transmission apparatus with a rotating electrical machine, which integrates a power generation function and an engine start function that are provided by an alternator and a starter motor of a vehicle.

Description of the Related Art

As a power generator for a vehicle, there has been known, as shown in FIG. 19, an alternator 105 that is connected to a pulley 103 provided at a crankshaft end 102 of an internal combustion engine 101 via a V-belt 104.

Further, other apparatuses are known including an apparatus obtained by adding a drive function to the alternator 105 to enable the start of the internal combustion engine in a warm state (after warming-up) (cf. an ISG (integrated starter generator) in each of Patent Documents 1 to 3), thereby further assisting the driving force while the vehicle is running.

PRIOR ART DOCUMENTS

Patent Documents

[Patent Document 1] Japanese Patent No. 4,782,348
[Patent Document 2] Japanese Patent No. 4,787,242
[Patent Document 3] Japanese Translation of PCT International Application Publication No. 2009-508464

However, in the above method for starting the internal combustion engine, it may not be possible to start the internal combustion engine in a cold state. This is because, for example, when the internal combustion engine is in the cold state, viscosity of lubricant in the internal combustion engine increases with a fall in temperature of the lubricant, and agitating resistance at the start of the engine increases, while a friction coefficient between the V-belt 104 and the pulley 103 decreases, to bring about slippage between the V-belt 104 and the pulley 103, whereby the rotation driving force of the alternator 105 cannot be transmitted to the internal combustion engine 101.

Considering such a problem, a vehicle provided with the apparatus as described above necessarily includes a starter motor 106 separately from the alternator 105 so as to also deal with the start of the internal combustion engine in the cold state. Note that in FIG. 19, reference numeral 107 denotes a ring gear, reference numeral 108 denotes a vehicle starting device such as a torque converter, and reference numeral 109 denotes a transmission.

SUMMARY OF THE INVENTION

Therefore, an object of the present disclosure is to solve the above problem and provide a power transmission apparatus with a rotating electrical machine, the apparatus coupling an internal combustion engine with the rotating electrical machine to reliably allow the start of the internal combustion engine in a cold state without using a V-belt and a pulley.

A power transmission apparatus with a rotating electrical machine according to the present disclosure, the apparatus being disposed on a power transmission path from an output shaft of an internal combustion engine to a transmission in a vehicle, the apparatus comprising a rotating electrical machine that includes a rotor coupled to a synchronous rotating member that rotates synchronously with the output shaft of the internal combustion engine, and taking a central axis of the output shaft of the internal combustion engine as a rotating shaft, and a stator fixed to a fixing member on a non-rotating side with respect to the synchronous rotating member, and facing the rotor with a first gap therebetween.

According to the above aspect of the present disclosure, the rotating electrical machine is disposed such that the rotor of the rotating electrical machine is coupled to the synchronous rotating member that rotates synchronously with the output shaft of the internal combustion engine, and the central axis of the output shaft of the internal combustion engine becomes the rotating shaft of the rotor. Hence it is possible to reliably transmit the rotation driving force of the rotating electrical machine to the internal combustion engine even in a cold state, and reliably start the internal combustion engine in the cold state.

DETAILED DESCRIPTION

Figure 1A:
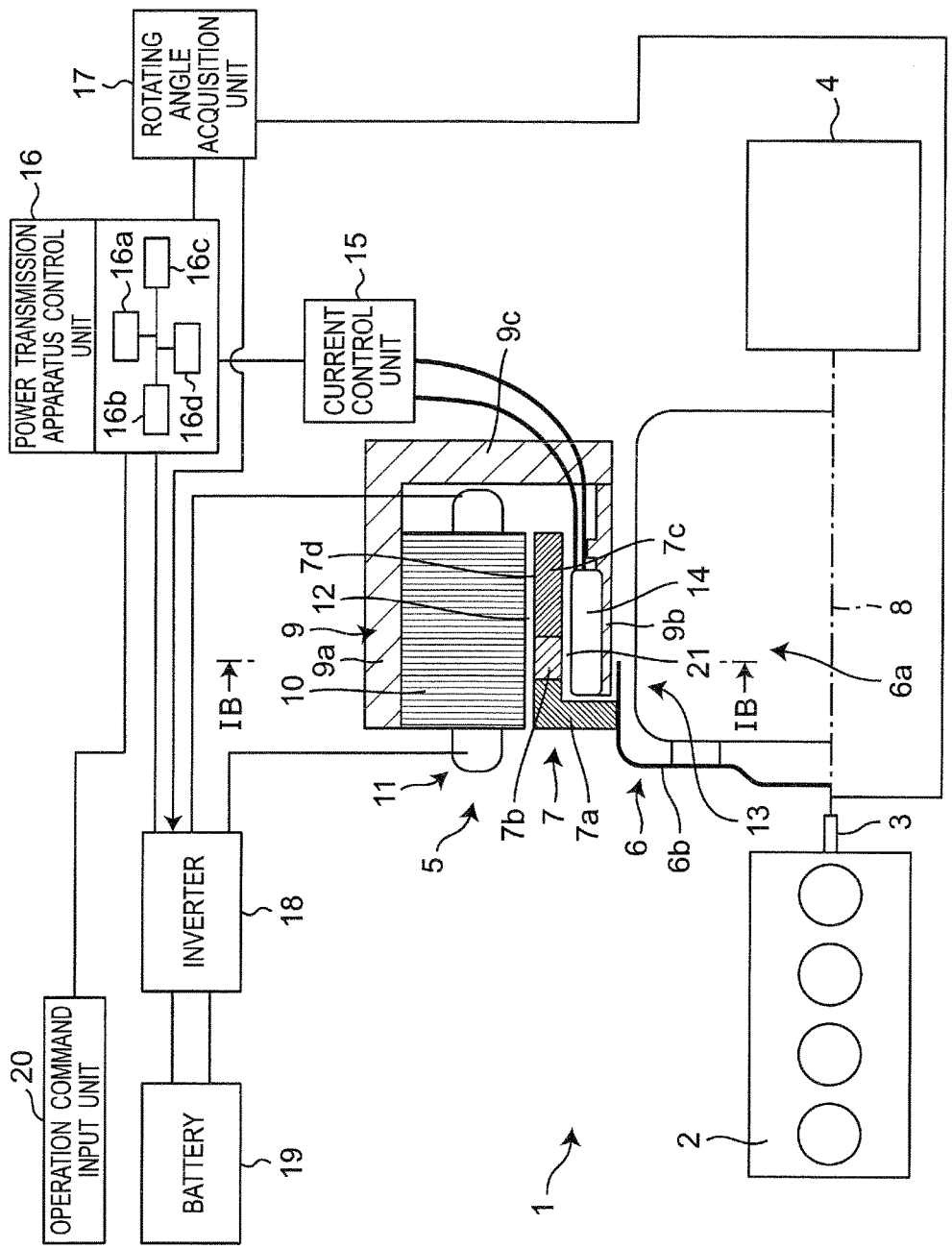
FIG. 1A is an explanatory view showing a component such as a rotating electrical machine as a half cross section with respect to a rotating shaft in one example of a power transmission apparatus provided with a rotating electrical machine according to a first embodiment of the present disclosure.

Hereinafter, embodiments in the present disclosure are described in detail with reference to the drawings.

In the embodiments of the present disclosure, in a power transmission apparatus such as a clutch, a torque converter, or a fluid coupling, a rotating electrical machine is disposed such that a central axis of an output shaft of an internal combustion engine becomes a rotating shaft of a rotor, to reliably allow transmission of the rotation driving force of the rotating electrical machine to the internal combustion engine even in a cold state, and reliably start the internal combustion engine in the cold state.

Further, in the embodiments of the present disclosure, when the power transmission apparatus is to be disposed in combination with the rotating electrical machine, it is configured such that a power generation function and an internal combustion engine start function of an alternator and a starter motor are integrated so as to be both exerted by one rotating electrical machine, thereby reducing the cost and space.

Generally, required characteristics of the internal combustion engine start function and power generation function are completely opposite. High torque and low rotation speed are required at the start of the internal combustion engine, whereas low torque and high rotation speed are required at the time of power generation. Therefore, for integrating the power generation function and the internal combustion engine start function into one rotating electrical machine, the rotating electrical machine is required to achieve wide N-T characteristics so as to exert both the power generation function and the internal combustion engine start function. Hence a magnetizing force adjustment device capable of adjusting magnetizing force of the rotor is provided.

Further, when the rotating electrical machine includes a brush at the time of disposing the machine, the life of the apparatus becomes finite, and when the brush is disposed inside a torque converter housing or the like, it is problematic in terms of a usage environment. Hence the rotating electrical machine is configured to be first made brushless and then incorporated as the rotating electrical machine and the power generator.

Note that the same parts or portions are provided with the same reference numeral in descriptions of the respective embodiments, repeated description will not be made.

<First Embodiment>

Figure 1B:
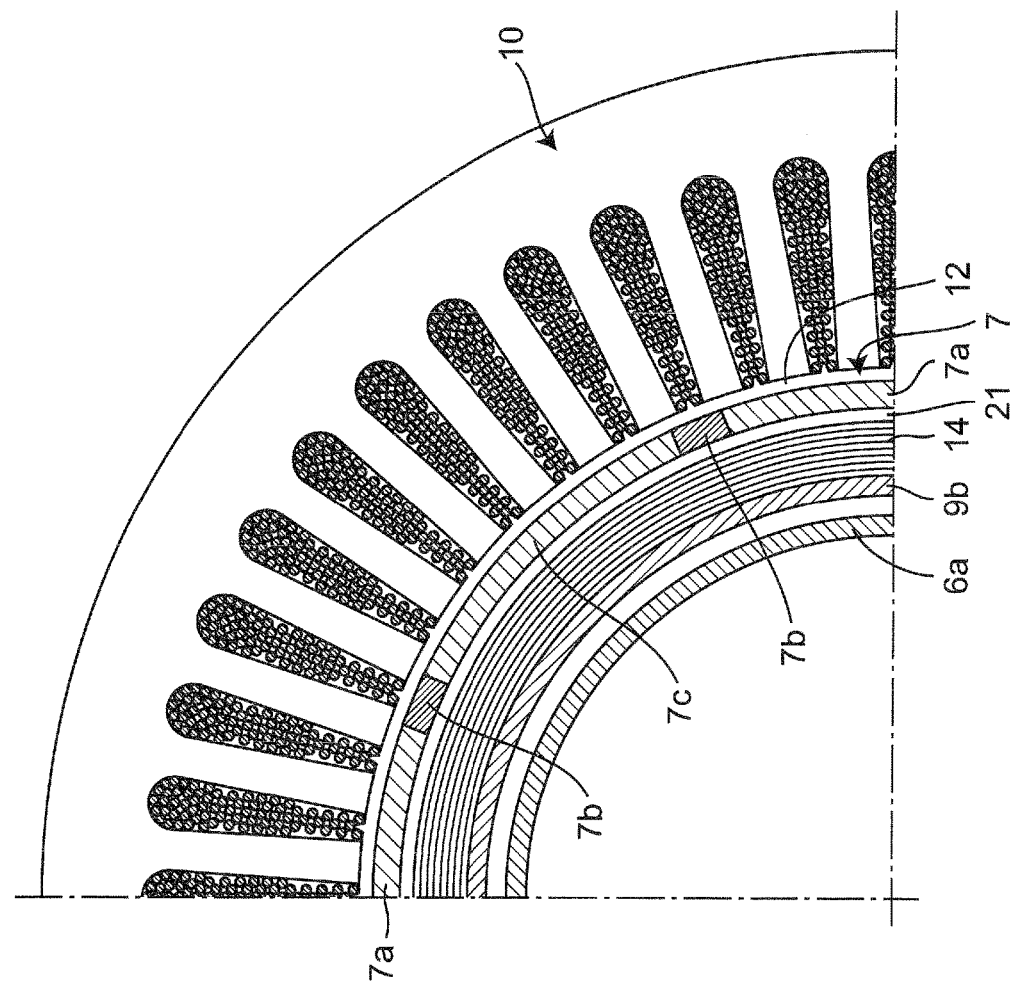
FIG. 1B is a sectional view showing part of a cross section along line IB-IB of FIG. 1A in one example of the power transmission apparatus of FIG. 1A.

As shown in FIGS. 1A and 1B, a power transmission apparatus 5 provided with a rotating electrical machine according to a first embodiment of the present disclosure is disposed in an internal combustion engine of a vehicle 1, for example on a power transmission path from an output shaft 3 of an engine 2 to a transmission 4, and provided with a rotating electrical machine 11. Note that in the following figures, blocks such as a power transmission apparatus control unit 16 shown in FIG. 1A may be omitted in other figures in order to facilitate understanding. In each of the present embodiment, modified examples thereof, and the like, similar blocks such as the control unit 16 are provided.

The rotating electrical machine 11 has a structure similar to that of a brushless alternator used in a commercial vehicle and the like, and includes a claw pole type rotor 7, and an annular stator 10.

The rotor 7 is coupled to a synchronous rotating member 6 that rotates synchronously with the output shaft 3 of the engine 2, and takes a central axis of the output shaft 3 of the engine 2 as a rotating shaft 8. Hence the output shaft 3 of the engine 2 and the rotating shaft 8 of the rotor 7 in the rotating electrical machine 11 have the same central axis.

The stator 10 is fixed to a fixing member 9 on a non-rotating side with respect to the synchronous rotating member 6, outside the rotor 7, and faces the rotor 7 with a first gap 12 therebetween. The stator 10 is wound with stator windings as shown in FIG. 1B, for example, and disposed so as to surround an outer periphery of the rotor 7.

In the first embodiment, as one example, a description is given of a case where the synchronous rotating member 6 is a drive plate 6b coupled to the engine side of a torque converter 6a. The drive plate 6b is coupled with the output shaft 3 of the engine 2 and rotates synchronously therewith.

Figure 2:
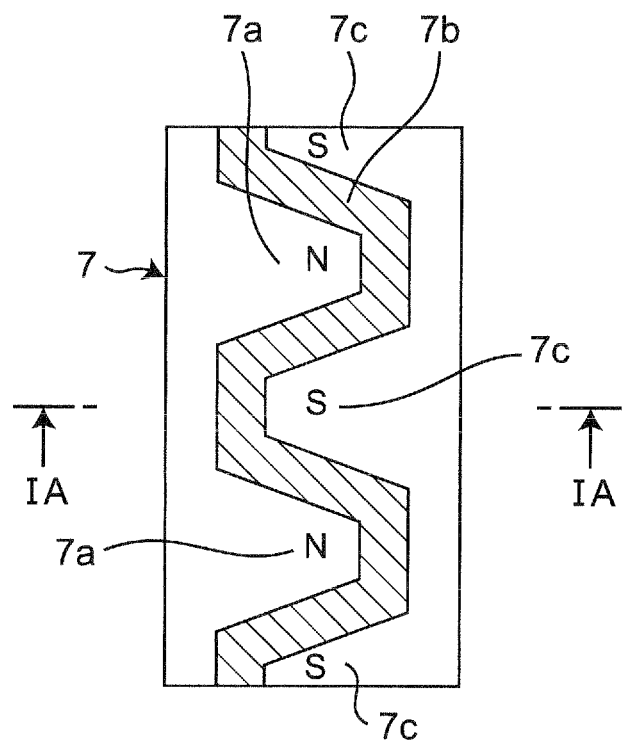
FIG. 2 is a developed view of a rotor in the rotating electrical machine of FIG. 1A.

More specifically, the rotor 7 is a cylindrical member with an I-shaped cross section, which rotates around the same axis (the rotating shaft 8) as the output shaft 3, and has the upstream-side (engine-side) end fixed to the outer surface of the downstream-side (the opposite side to the engine) end of the drive plate 6b. The rotor 7 extends in a direction orthogonal to the axial direction of the rotating shaft 8, namely, radially outward from the upstream-side end, and is then bent at right angles and extends as a cylindrical wall portion 7d in the axial direction of the rotating shaft 8. In this cylindrical wall portion, a first claw pole (claw-shaped magnetic pole) 7a, a non-magnetic body 7b, and a second claw pole (claw-shaped magnetic pole) 7c are integrally disposed, to constitute a claw-shaped rotor. That is, as shown in FIG. 2, the first claw pole 7a and the second claw pole 7c each formed of a magnetic body such as iron are disposed so as to alternately project in a claw shape and form a wavy line along a peripheral direction of the rotor 7 (a vertical direction of FIG. 2), and the band-like non-magnetic body 7b of aluminum or the like is disposed meandering in a wavy line shape between the first claw pole 7a and the second claw pole 7c. Note that FIG. 1A is a sectional view obtained by cutting along line IA-IA of FIG. 2. FIG. 1B is a sectional view obtained by cutting along line IB-IB of FIG. 1A.

Meanwhile, the stator 10 disposed outside the rotor 7 is cylindrically disposed radially outside the rotor 7 with the first gap 12 therebetween. That is, the fixing member 9 fixed to a housing (not shown) of the power transmission apparatus 5 is disposed on an outer periphery of the torque converter 6a. The fixing member 9 is configured to have a double cylindrical shape of an inner cylindrical portion 9b and an outer cylindrical portion 9a, and have a space between the downstream-side end of the inner cylindrical portion 9b and the downstream-side end of the outer cylindrical portion 9a, the space being covered by an annular plate portion 9c. A cylindrical wall portion 7d of the rotor 7 has been inserted from the upstream-side end into the space between the inner cylindrical portion 9b and the outer cylindrical portion 9a. Note that the fixing member 9 may be part of the housing of the power transmission apparatus 5.

The stator 10 is fixed to the inner surface of the outer cylindrical portion 9a of the fixing member 9. The rotor 7 is disposed facing the stator 10 with the first gap 12 therebetween. The facing surfaces of the stator 10 and the rotor 7 have the same lengths in the rotating shaft-axial direction. Therefore, when seen from the stator 10, at the same position, the first claw pole 7a and the second claw pole 7c alternately face each other as the rotor 7 rotates. For example, when the first claw pole 7a and the second claw pole 7c are respectively excited to be an N-pole and an S-pole, the N-poles and the S-poles alternately face each other to generate electromotive force. Although a permanent magnet is disposed in typical motor, a permanent magnet is not disposed in this first embodiment, and hence a field coil 14 is excited to control magnetizing force of the field coil 14 and is caused to function as the permanent magnet, thereby exerting the power generation function.

The cylindrical field coil 14 is fixed and disposed onto the outer surface of the inner cylindrical portion 9b of the fixing member 9, and the field coil 14 is disposed facing the rotor 7 with a second gap 21 therebetween. The field coil 14 is connected with a current control unit 15 as one example of the magnetizing force adjustment control unit that supplies and controls a direct current as one example of the electric energy that is supplied to the field coil 14. As described in detail later, the field coil 14 and the current control unit 15 constitute one example of a magnetizing force adjustment device 13 for adjusting the magnetizing force of the rotor 7 so as to be different between at the start of the internal combustion engine and at the time of power generation. Hence the magnetizing force of the rotor 7 is made different between at the start of the internal combustion engine and at the time of power generation, to make an inductive voltage that is generated in the stator 10 different therebetween.

In this manner, the rotor 7 rotates between the stator 10 and the field coil 14.

Now, operation of the claw-shaped rotor 7 is described. First, when the current control unit 15 allows a current to flow in the field coil 14, the first claw pole 7a and the second claw pole 7c are excited. For example, the first claw pole 7a is excited to be the N-pole side, and the second claw pole 7c is excited to be the S-pole side. Hence the first claw pole 7a and the second claw pole 7c disposed on the peripheral direction of the claw-shaped rotor 7 are alternately excited to be the N-poles and the S-poles, and by this claw-shaped rotor 7 rotating around the rotating shaft 8, electromotive force having an inductive voltage is generated in the stator 10 outside the claw-shaped rotor 7. Therefore, when the current control unit 15 controls the currents that are allowed to flow in the field coil 14 so as to be different between at the start of the internal combustion engine and at the time of power generation, it is possible to make the magnetizing forces of the rotor 7 different therebetween, and consequently make the inductive voltages that are generated in the stator 10 different therebetween.

The power transmission apparatus 5 further includes an inverter 18 electrically connected to the stator 10, and the power transmission apparatus control unit 16 for controlling the drive of the inverter 18.

The inverter 18 is connected to the stator 10, and converts an alternating current generated in the stator 10 to a direct current in a power generation mode. The inverter 18 is further connected to a battery 19, and charges the battery 19 with the converted direct current in the power generation mode. Meanwhile, in a start mode, the inverter 18 converts the direct current from the battery 19 to an alternating current and supplies the converted alternating current to the stator 10 for magnetization.

The power transmission apparatus control unit 16 is inputted with information of an operation command, a voltage, and a rotating speed. Based on the inputted information, the power transmission apparatus control unit 16 controls operation of each of the inverter 18 and the current control unit 15. As one example, the power transmission apparatus control unit 16 is inputted with a command/information from an operation command input unit 20, and inputted with information such as a voltage detected by the inverter 18, and a rotating speed acquired by a rotating angle acquisition unit 17 acquiring a rotating angle and the inverter 18 performing calculation. Based on the information inputted as above, the power transmission apparatus control unit 16 separately controls the operation of each of the inverter 18 and the current control unit 15. The operation command input unit 20 is made up of an ignition switch, for example, and the power transmission apparatus control unit 16 receives a start command for the engine 2 from the operation command input unit 20. The rotating angle acquisition unit 17 is, as one example, made up of a resolver for detecting a rotating angle of the engine 2 from the output shaft 3 or the like. The resolver detects a rotating angle and inputs the detected rotating angle into the inverter 18. The inverter 18 acquires a rotating speed of the rotor 7 by calculation from the rotating angle, and the power transmission apparatus control unit 16 receives the acquired rotating speed of the rotor 7 from the inverter 18. Alternatively, the power transmission apparatus control unit 16 may perform direct calculation from the information of the rotating angle acquisition unit 17 to acquire rotating speed information, or the power transmission apparatus control unit 16 may be inputted with the rotating speed information from the operation command input unit 20 or the like to acquire the rotating speed information.

Based on the information from the operation command input unit 20 and the information from the inverter 18 via the rotating angle acquisition unit 17, the power transmission apparatus control unit 16 determines which is to be the mode among a plurality of modes including at least the start mode and the power generation mode. In accordance with the determined mode, the power transmission apparatus control unit 16 controls the drive or the drive stoppage of the inverter 18, and outputs a control command and the like to the current control unit 15, to control the power transmission apparatus 5.

The power transmission apparatus with the rotating electrical machine according to the above configuration is operated as follows, for example.

First, a description is given of a case where the power transmission apparatus control unit 16 receives the start command for the engine 2 from the operation command input unit 20, determines the mode to be the engine start mode, and causes the rotating electrical machine 11, as a starter, to exert the start function. Based on the start command for the engine 2, the power transmission apparatus control unit 16 drives the inverter 18 to allow a three-phase AC current to flow in the stator 10 and magnetize the stator 10, and the power transmission apparatus control unit 16 also controls the current control unit 15 to allow a current to flow in the field coil 14. By allowing the current to flow in the field coil 14, the first claw pole 7a and the second claw pole 7c of the rotor 7 are excited. As a result, the rotor 7 starts rotation with respect to the stator 10, and electromotive force having an inductive voltage is generated in the stator 10. This series of operations is one example, and can also be performed in a reverse order.

Figure 3:
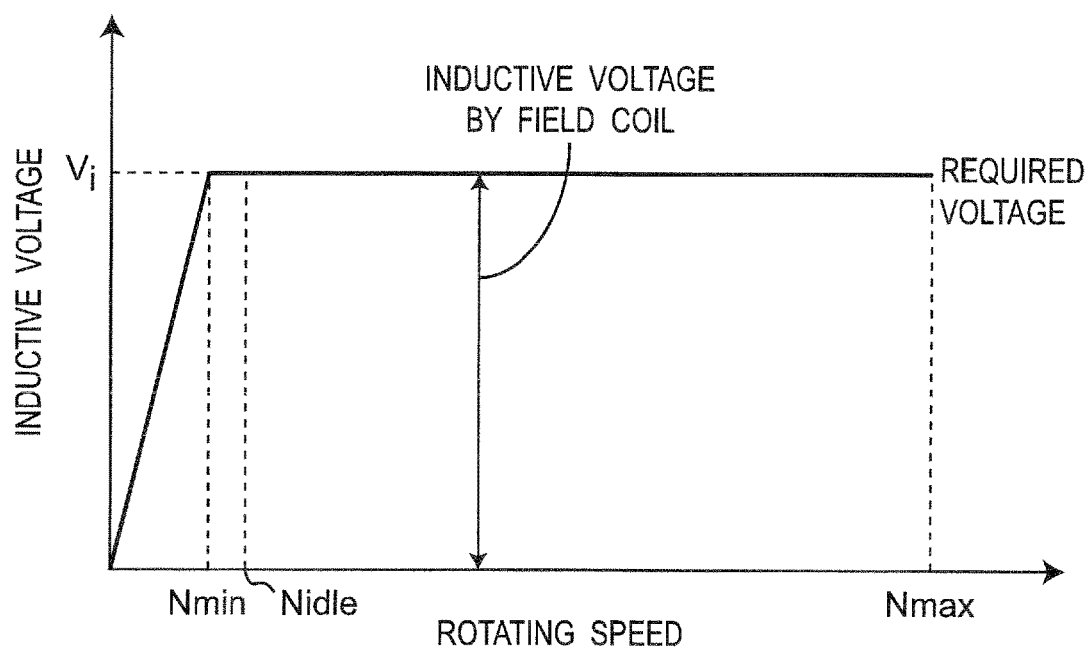
FIG. 3 is a graph showing one example of characteristics of an inductive voltage and a rotating speed of the rotating electrical machine in the power transmission apparatus according to the first embodiment.

Subsequently, as shown in FIG. 3, the inductive voltage increases in accordance with the rotating speed of the rotor 7, and when the power transmission apparatus control unit 16 determines that the rotating speed has reached a rotating speed Nmin at initial explosion which is lower than an idling rotating speed Nidle corresponding to idling of the engine 2, the power transmission apparatus control unit 16 stops the drive of the inverter 18, and automatically shifts the mode to the power generation mode, namely, the case of exerting the power generation function with the rotating electrical machine 11 used as a power generator, so as to hold a predetermined inductive voltage (required voltage) Vi thereafter. The predetermined inductive voltage (required voltage) Vi is any voltage value around 14V in an automobile, for example.

In this power generation mode, when the power transmission apparatus control unit 16 continues to excite the field coil 14 via the current control unit 15, the excitation current is adjusted by the current control unit 15 so as to make the inductive voltage constant at the predetermined inductive voltage Vi. When the current control unit 15 is to adjust the excitation current, first, the current control unit 15 adjusts the excitation current so as to make the magnetizing force of the field coil 14 constant. This means that the field coil 14 functions as if it were a permanent magnet. When the rotor 7 rotates in such a state as if the permanent magnet were disposed, the rotating electrical machine 11 functions as a power generator.

When the magnetizing force of the field coil 14 is constant, the inductive voltage increases with an increase in rotation of the rotor 7 with respect to the stator 10. However, when the current control unit 15 controls the current so as to decrease, it is possible to reduce the inductive voltage, and as a result, it is possible to control the inductive voltage so as to be constant.

As a more specific example of the case of making the inductive voltage constant, it can be controlled as follows. Since the relation among the current of the field coil 14, the inductive voltage, and the rotating speed is previously known from the following expression and the like previously stored into a storage unit 16a in the power transmission apparatus control unit 16, an arithmetic unit 16b in the power transmission apparatus control unit 16 calculates an inductive voltage by use of the information previously stored into the storage unit 16a based on the information of the rotating speed and the current of the field coil 14. Subsequently, when a determination unit 16c in the power transmission apparatus control unit 16 determines that the inductive voltage calculated by the arithmetic unit 16b has deviated from a permissive range for the inductive voltage where the inductive voltage is regarded as constant, the arithmetic unit 16b calculates a current amount to be reduced based on an amount of the deviation. An instruction unit 16d outputs a current control instruction to the current control unit 15 based on the result of calculation by the arithmetic unit 16b, and thereby the current control unit 15 controls the current so as to increase or decrease. In this manner, the inductive voltage can be controlled so as to be constant.

inductive voltage $E$ [V]=magnetic flux density $B$ [T]×length $L$ [m]×speed $V$ [m/s]

magnetic flux density $B$ [T]=magnetic permeability $\mu$×number of coil windings $N$ [turns]×current $I$ [A]/(2×coil radius $r$ [m])

As an intermediate mode between the start mode and the power generation mode, a vehicle drive assist mode can also be set in the power transmission apparatus control unit 16. When the vehicle drive assist mode is set as above and the power transmission apparatus control unit 16 automatically shifts the mode from the power generation mode to the vehicle drive assist mode to make the apparatus act as a vehicle drive assist apparatus, for example, for the purpose of improving the fuel efficiency, it is possible to assist the drive of the vehicle by the current control unit 15 appropriately adjusting the magnetizing force of the field coil 14 in accordance with the rotating speed, while driving the inverter 18. For example, when the current control unit 15 controls the magnetizing force so as to be lower than a predetermined value, the rotating speed can be made higher than a predetermined rotating speed corresponding to the magnetizing force of the predetermined value. As one example, the current control unit 15 can adjust the magnetizing force of the field coil 14 such that the magnetizing force is high when the rotating speed is low, and to the contrary, the magnetizing force is low when the rotating speed is high. Note that appropriate adjustment of the magnetizing force of the field coil 14 by the current control unit 15 in accordance with the rotating speed may be performed simply by the power transmission apparatus control unit 16 controlling the current control unit 15 based on a program previously set so as to improve the fuel efficiency, for example, and stored into the power transmission apparatus control unit 16.

When the magnetizing force is fixed, the state is fixed to either the high torque and low rotation speed or the low torque and high rotation speed, which are characteristics defined in the start mode and the power generation mode. However, when the magnetizing force is fluctuated as described above without limiting the mode to the start mode or the power generation mode, the rotating speed can also be fluctuated. For example, while the torque is lowered, the rotating speed can be made high with the same output, and this is also effective as a vehicle start assist at the time of starting the engine 2 to start the vehicle.

Note that the mode may be automatically shifted from the power generation mode to the vehicle drive assist mode only when the user inputs into the power transmission apparatus control unit 16 an instruction that the vehicle drive assist mode may be applied.

Note that the inverter 18 includes an inverter driving circuit, not shown, and when the drive of the inverter 18 is stopped and the inverter driving circuit starts to exert the power generation function, the inverter driving circuit can function as a rectifier, since arrangement of diodes in the inverter driving circuit is the same as that in a rectifier. This eliminates the need to separately provide a rectifier for power generation, thereby enabling reduction in cost and disposing space.

Figure 4:
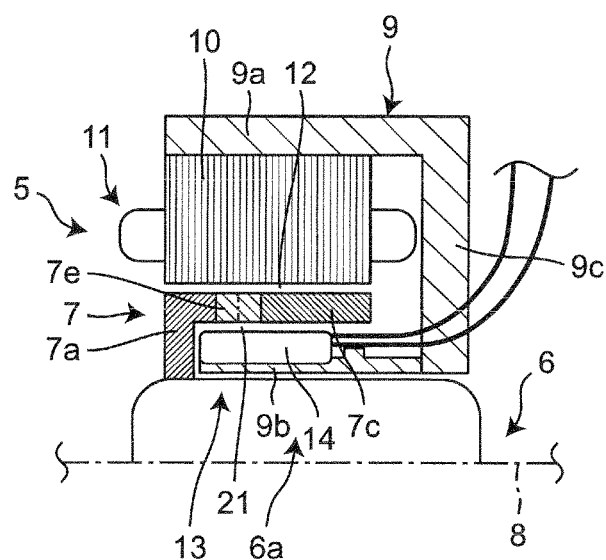
FIG. 4 is a partial explanatory view showing a component such as a rotating electrical machine as a half cross section with respect to a rotating shaft in another example of the power transmission apparatus provided with the rotating electrical machine according to a modified example of the first embodiment of the present disclosure.
Figure 5:
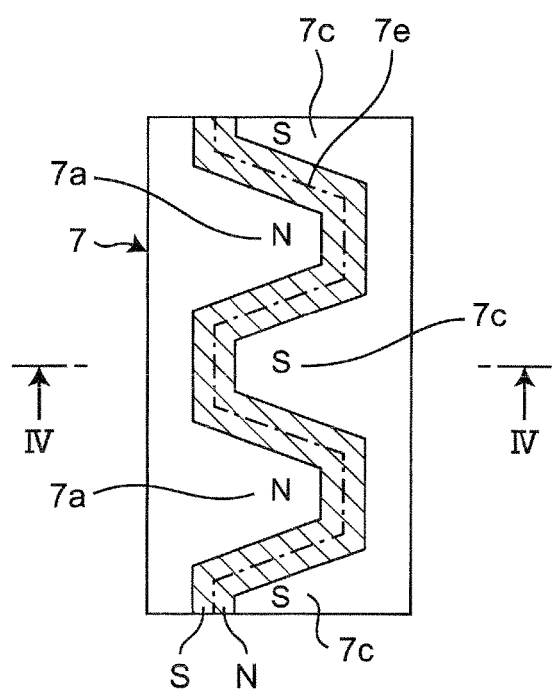
FIG. 5 is a developed view of the rotor in a rotating electrical machine of FIG. 4.
Figure 6:
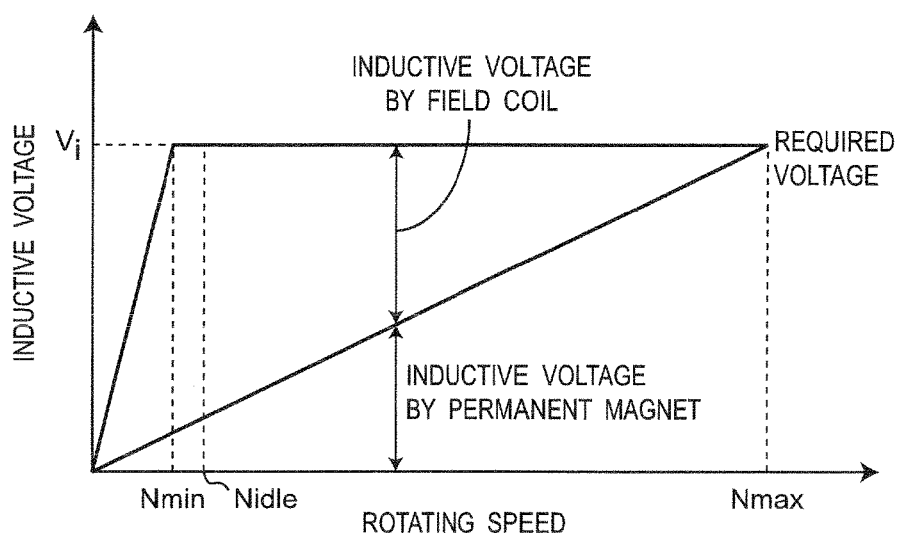
FIG. 6 is a graph showing one example of characteristics of an inductive voltage and a rotating speed of the rotating electrical machine of FIG. 4.

As a modified example of the first embodiment, as shown in FIG. 4, the rotor 7 is directly fixed to the outer shell of the torque converter 6a that is coupled with the output shaft 3 of the engine 2 and rotates synchronously therewith, and a permanent magnet 7e is disposed in the rotor 7 in place of the non-magnetic body 7b to assist the magnetizing force of the rotor 7 which is generated by the field coil 14. A permanent magnet 7e with weak magnetic force is disposed in the position corresponding to the non-magnetic body 7b of FIG. 2. The magnetic force of the permanent magnet 7e is taken as the minimum required magnetic force in any of the power generation mode, the engine start mode, the vehicle drive assist mode, and the like. The magnetic force of the permanent magnet 7e is used as such minimum required magnetic force. Meanwhile, magnetic force to be fluctuated is assumed to be magnetizing force in the field coil. That is, only the inductive voltage has been generated by the field coil 14 in FIG. 3, whereas in FIG. 6, a total inductive voltage obtained by adding the inductive voltage generated by the permanent magnet 7e to the inductive voltage generated by the field coil 14 becomes an inductive voltage generated in the stator 10. For this reason, the inductive voltage that is generated by the field coil 14 can be made small, and the magnetizing force can be made small, namely, a current allowed to flow in the field coil 14 can be made small. Note that the inductive voltage that is generated by the permanent magnet 7e at the maximum rotating speed Nmax is controlled so as not to exceed the inductive voltage (required voltage) Vi at the time of controlling the inductive voltage so as to be constant.

Figure 7:
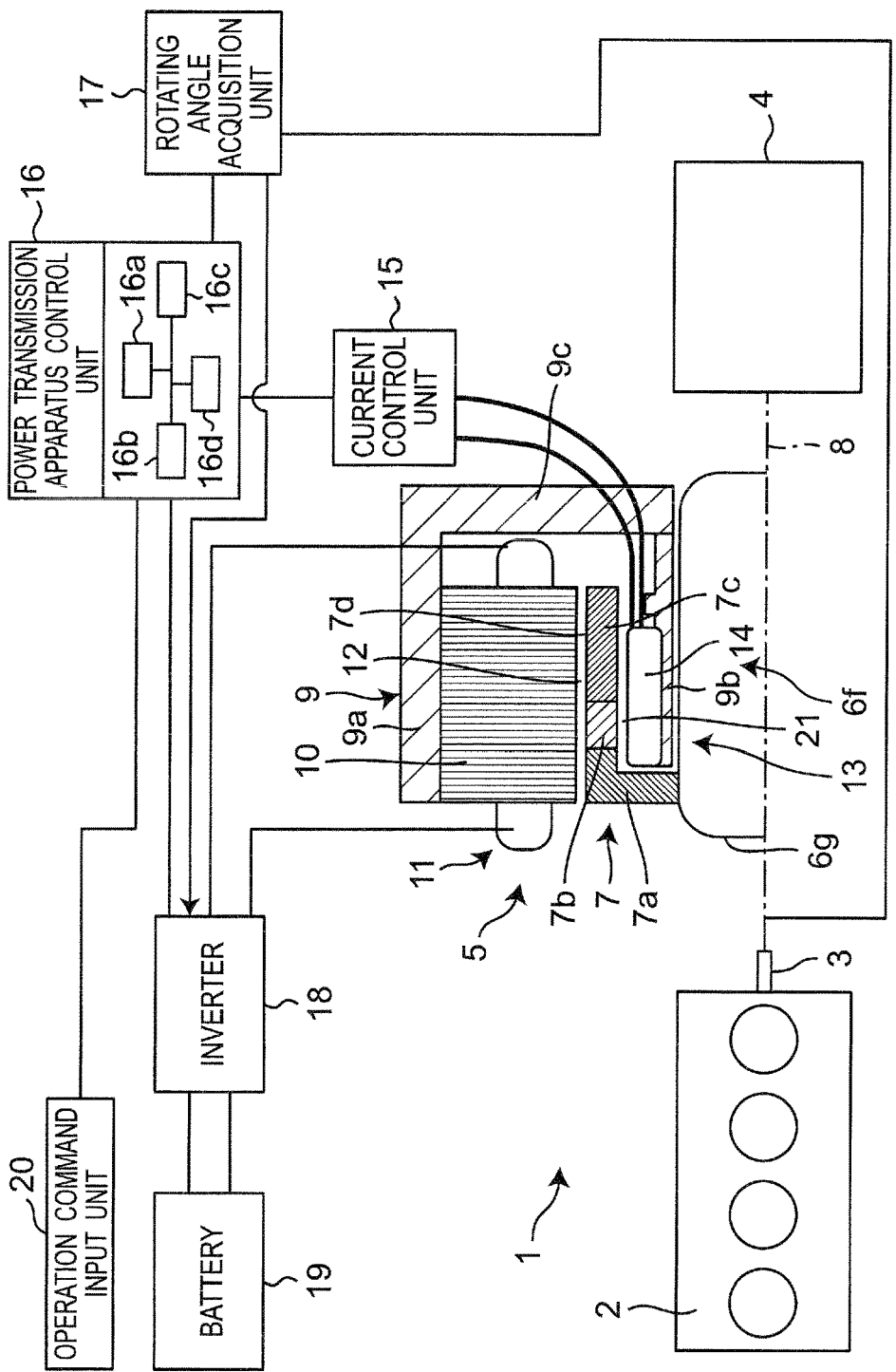
FIG. 7 is an explanatory view showing a component such as a rotating electrical machine as a half cross section with respect to a rotating shaft in another example of the power transmission apparatus provided with the rotating electrical machine according to the first embodiment of the present disclosure.
Figure 8:
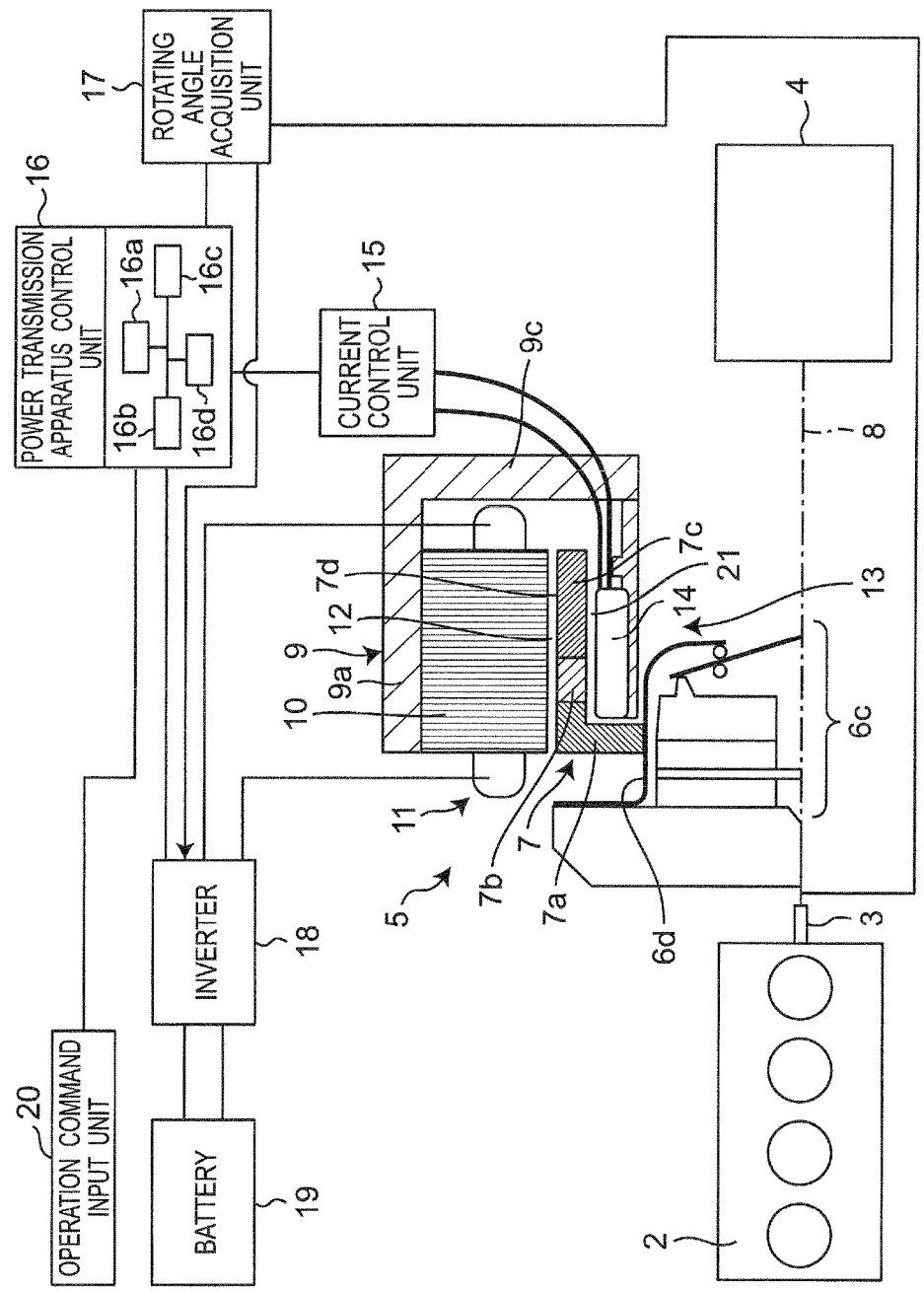
FIG. 8 is an explanatory view showing a component such as a rotating electrical machine as a half cross section with respect to a rotating shaft in still another example of the power transmission apparatus provided with the rotating electrical machine according to the first embodiment of the present disclosure.

Although the rotor 7 is directly fixed to the outer shell of the torque converter 6a in this modified example, the present disclosure is not limited thereto, and the rotor 7 may be coupled to another synchronous rotating member 6 as in FIG. 1, 7, or 8.

FIG. 7 describes a case where the synchronous rotating member 6 is an outer shell 6g of a fluid coupling 6f as another example of the power transmission apparatus of the first embodiment. The outer shell 6g is coupled with the output shaft 3 of the engine 2 and rotates synchronously therewith. Note that the synchronous rotating member 6 may be a drive plate coupled to the internal-combustion-engine side of the fluid coupling 6f in place of the outer shell 6g of the fluid coupling 6f.

FIG. 8 describes a case where the synchronous rotating member 6 is a clutch cover 6d of a friction clutch 6c as still another example of the power transmission apparatus of the first embodiment. The clutch cover 6d is coupled with the output shaft 3 of the engine 2 via a flywheel and rotates synchronously therewith. Note that the synchronous rotating member 6 may be an outer shell of the friction clutch 6c, such as a flywheel coupled to the internal-combustion-engine side of the friction clutch 6c in place of the clutch cover 6d.

Figure 9:
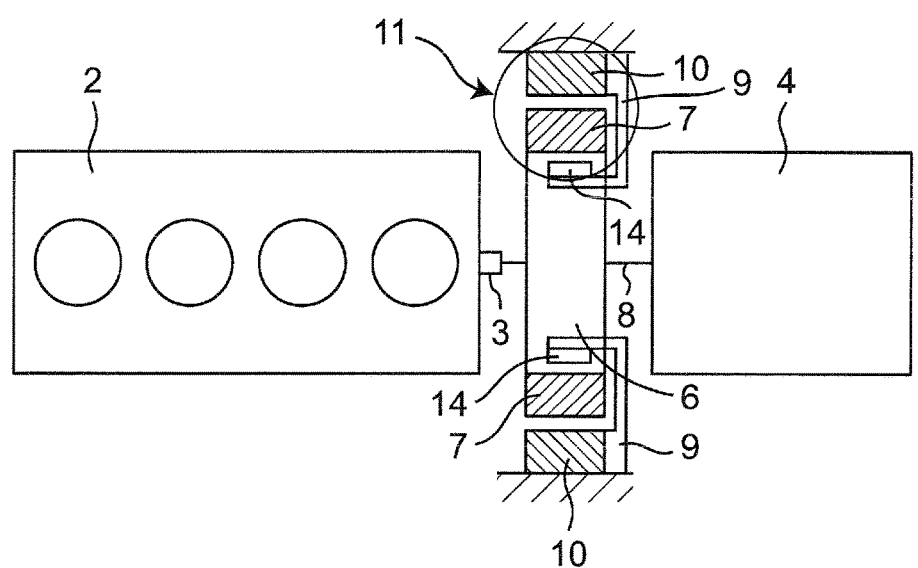
FIG. 9 is a schematic view of the power transmission apparatus provided with the rotating electrical machine according to the first embodiment of the present disclosure.

According to the first embodiment, as shown in FIG. 9, the rotating electrical machine 11 is disposed such that the rotor 7 of the rotating electrical machine 11 is coupled to the synchronous rotating member 6 that rotates synchronously with the output shaft 3 of the engine 2, and the central axis of the output shaft 3 of the engine 2 becomes the rotating shaft 8 of the rotor 7. It is thereby possible to reliably transmit the rotation driving force of the rotating electrical machine 11 to the engine 2 even in a cold state, and reliably start the engine 2 in the cold state.

Figure 19:
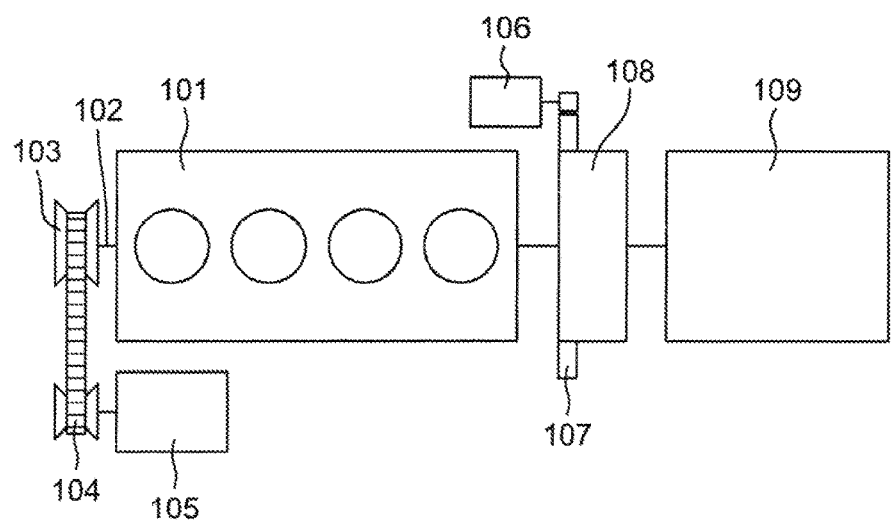
FIG. 19 is an explanatory view showing a relation among an internal combustion engine, a starter motor, and an alternator in a conventional example.

Accordingly, with respect to the conventional vehicle, the power generation function and the start function of the alternator 105 and the starter motor 106 shown in FIG. 19 are integrated into the configuration of the first embodiment, thereby enabling removal of the starter motor 106, the ring gear 107, the V-belt 104, and the pulley 103, and enabling reduction in cost. Further, the removal of these parts eliminates the need for the space where those parts have been disposed, thereby enabling reduction in size and weight. Moreover, since the magnetizing force adjustment device 13 for adjusting the magnetizing force is configured without including a rotation contact such as a brush, it is possible to prolong the life of the apparatus and minimize maintenance thereof. With no starter provided, the sound (squeak) of the starter with its gear meshing with a ring gear can be eliminated, to ensure quietness. Further, it is configured such that at the time of disposing the rotating electrical machine in the power transmission apparatus, a brushless structure is first formed and then the rotating electrical machine, also serving as the power generator, is incorporated due to the difficulty to replace the rotating electrical machine as compared with the conventional alternator, and due to the need to consider contact failure of the brush caused by a high temperature, vibration, and exposure to powder dust. With no brush provided for this reason, all the above points of concern can be completely eliminated and the life of the apparatus becomes infinite, and without the need for disposing the brush in the housing of the power transmission apparatus such as the torque converter, the problem in terms of the usage environment can also be dissolved.

<Second Embodiment>

A second embodiment is provided with a magnetizing force adjustment device 13B having a configuration different from that of the magnetizing force adjustment device 13 of the first embodiment. Specifically, as shown in FIGS. 10A to 10D and FIG. 11, the magnetizing force adjustment device 13B includes a field coil 39 and permanent magnets 40 in a rotor 37 of a rotating electrical machine 11B, and also includes: an induction coil 38 for supplying electric energy such as currents to the field coil 39; a rectifying circuit 33 (cf. FIG. 10A) or a rectifying/smoothing circuit 34 (cf. FIG. 11); and a current control unit 15B that serves as another example of the magnetizing force adjustment control unit and corresponds to the current control unit 15 of the first embodiment. The magnetizing force adjustment device 13B at least requires the rectifying circuit 33, and may more preferably include the rectifying/smoothing circuit 34 in place of the rectifying circuit 33. For example, when a frequency is very high, crests of waveforms can be ignored after rectification from an alternating current to a direct current in the rectifying circuit, and hence in such a case, only the rectifying circuit 33 may be provided.

The rectifying circuit 33 performs single-phase full-wave rectification, as one example. In the rectifying/smoothing circuit 34, the smoothing circuit can convert an alternating current to an even smoother direct current.

Similarly to the modified example of the first embodiment, although the rotor 37 is directly fixed to the outer shell of the torque converter 6a that is coupled to the output shaft 3 of the engine 2 and rotates synchronously therewith, it may be coupled to another synchronous rotating member 6 as in FIG. 1, 7, or 8.

Figure 10A:
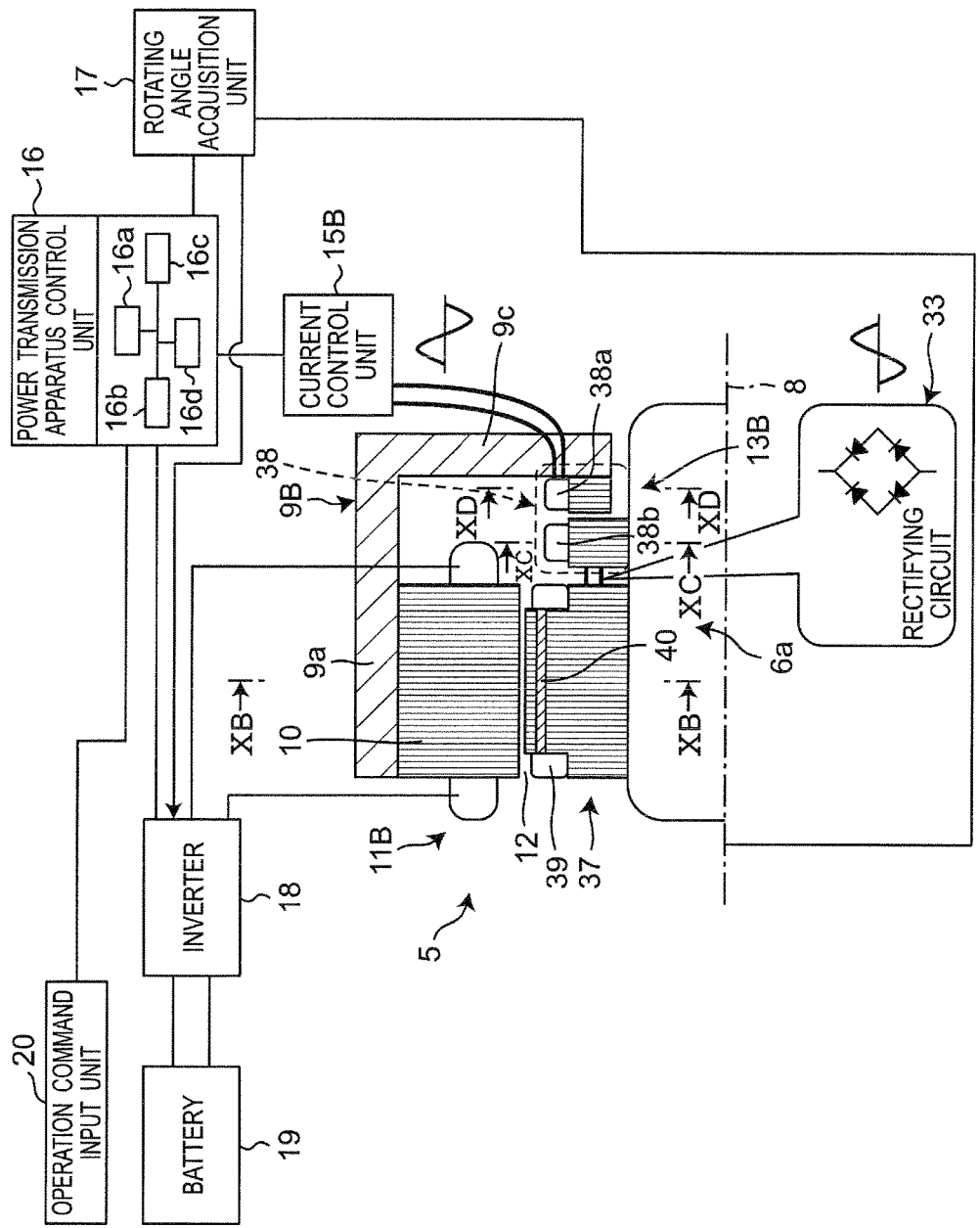
FIG. 10A is an explanatory view showing a component such as a rotating electrical machine as a half cross section with respect to a rotating shaft in one example of a power transmission apparatus provided with a rotating electrical machine according to a second embodiment of the present disclosure.
Figure 10B:
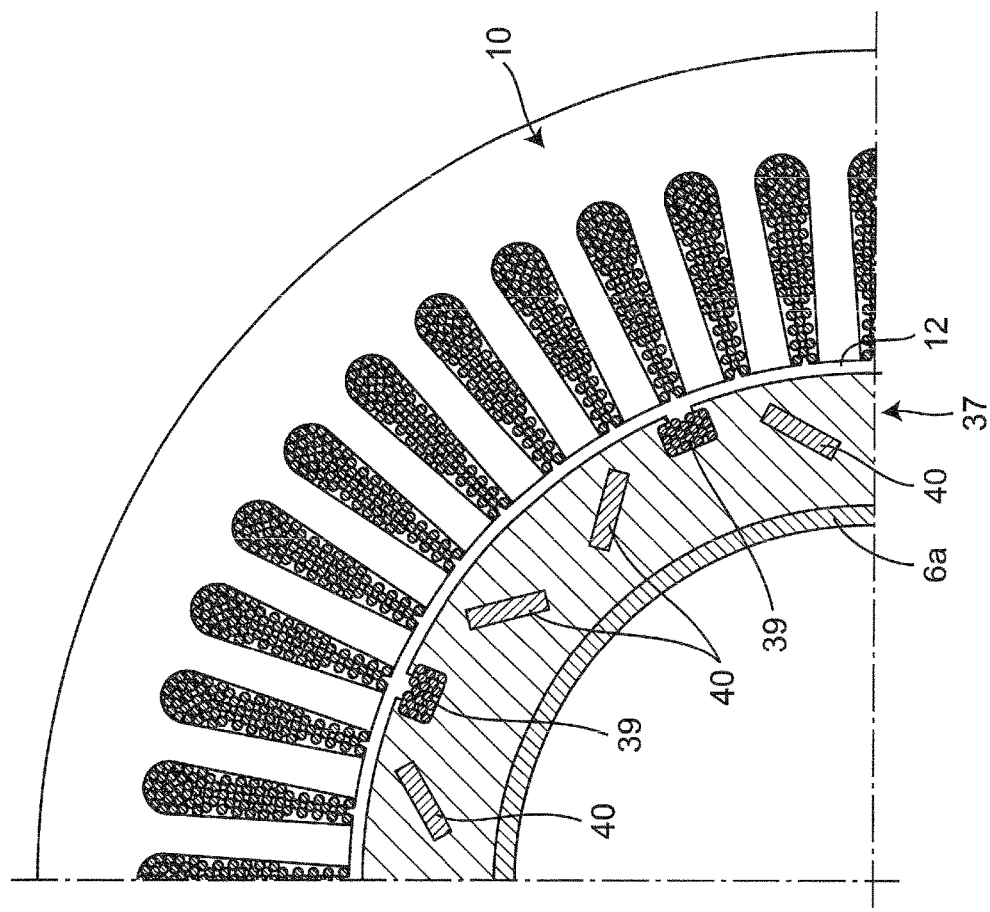
FIG. 10B is a sectional view showing part of a cross section along line XB-XB of FIG. 10A in the power transmission apparatus of FIG. 10A, where a fixing member has been omitted.

As shown in FIGS. 10A and 10B, while the field coil 39 is disposed in the rotor 37, permanent magnets 40 each having a plate shape in a cross section orthogonal to the rotating shaft 8 are intermittently disposed on an outer periphery of the field coil 39. In this manner, the permanent magnets 40 are disposed in an iron core of the field coil 39, to assist the magnetizing force of the field coil 14. In other words, the permanent magnets 40 with weak magnetic forces are disposed in positions corresponding to the iron core of the field coil 39. The magnetic force of this permanent magnet 40 is minimum required magnetic force in any of the power generation mode, the engine start mode, the vehicle drive assist mode, and the like. The magnetic force of the permanent magnet 40 is used as such minimum required magnetic force. Meanwhile, magnetic force to be changed is assumed to be the magnetizing force in the field coil 39. That is, as in the graph of FIG. 6, a total inductive voltage obtained by adding inductive voltages generated by the permanent magnets 40 to an inductive voltage generated by the field coil 39 becomes an inductive voltage generated in the stator 10. For this reason, the inductive voltage that is generated by the field coil 39 can be made small, and the magnetizing force can be made small, namely, a current allowed to flow in the field coil 39 (thus, a current of an induction coil (primary coil) 38a on the fixed side which is supplied from the current control unit 15B) can be made small. Note that the inductive voltages that are generated by the permanent magnets 40 at the maximum rotating speed Nmax is controlled so as not to exceed the inductive voltage (required voltage) Vi at the time of controlling the inductive voltages so as to be constant.

When the current rectified in the rectifying circuit 33 is supplied to the field coil 39, the field coil 39 is excited, and the rotor 37 rotates, to generate an inductive voltage in the stator 10.

The inductive voltage that is generated between the field coil 39 and the stator 10, i.e., inductive power, has characteristics as follows. A phenomenon of the inductive power is that, when an electric wire with a length L (m) is moved at right angles with a magnetic-field direction at a speed v (m/s) in a magnetic field with a uniform magnetic flux density B [Wb/m$^2$]≡[T], inductive power E (V) is generated at each end of a conductive wire being the electric wire, and a current flows.

At this time, the inductive power is represented by inductive power E=B*L*v[V].

In general, the inductive power E increases when the rotating speed v rises, and the inductive power E decreases when the rotating speed v falls. Thus, when the inductive power E fluctuates concurrently with fluctuation of the rotating speed v, the fluctuation of the inductive power E can be controlled by changing the magnetic flux density B. Accordingly, in the second embodiment, the current supplied from the induction coil 38 to the field coil 39 is controlled, to control the inductive voltage that is generated between the field coil 39 and the stator 10.

Figure 10C:
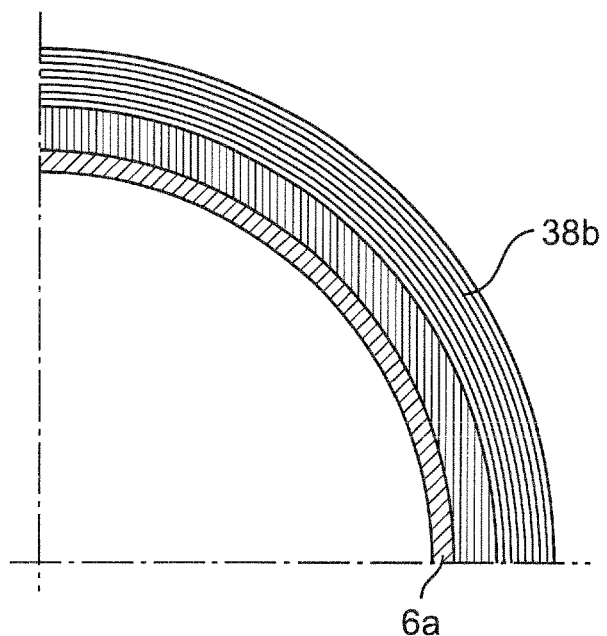
FIG. 10C is a sectional view showing part of a cross section along line XC-XC of FIG. 10A in an induction coil on the rotating side of the power transmission apparatus of FIG. 10A, where the fixing member has been omitted.
Figure 10D:
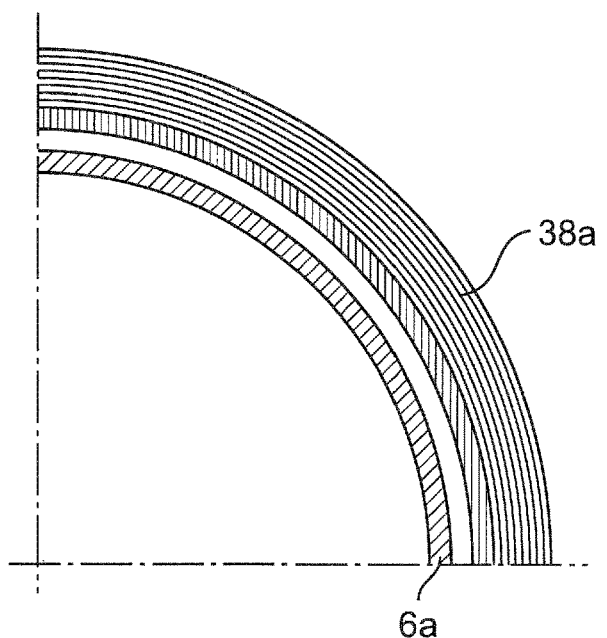
FIG. 10D is a sectional view showing part of a cross section along line XD-XD of FIG. 10A in the induction coil on the fixed side of the power transmission apparatus of FIG. 10A, where the fixing member has been omitted.
Figure 11:
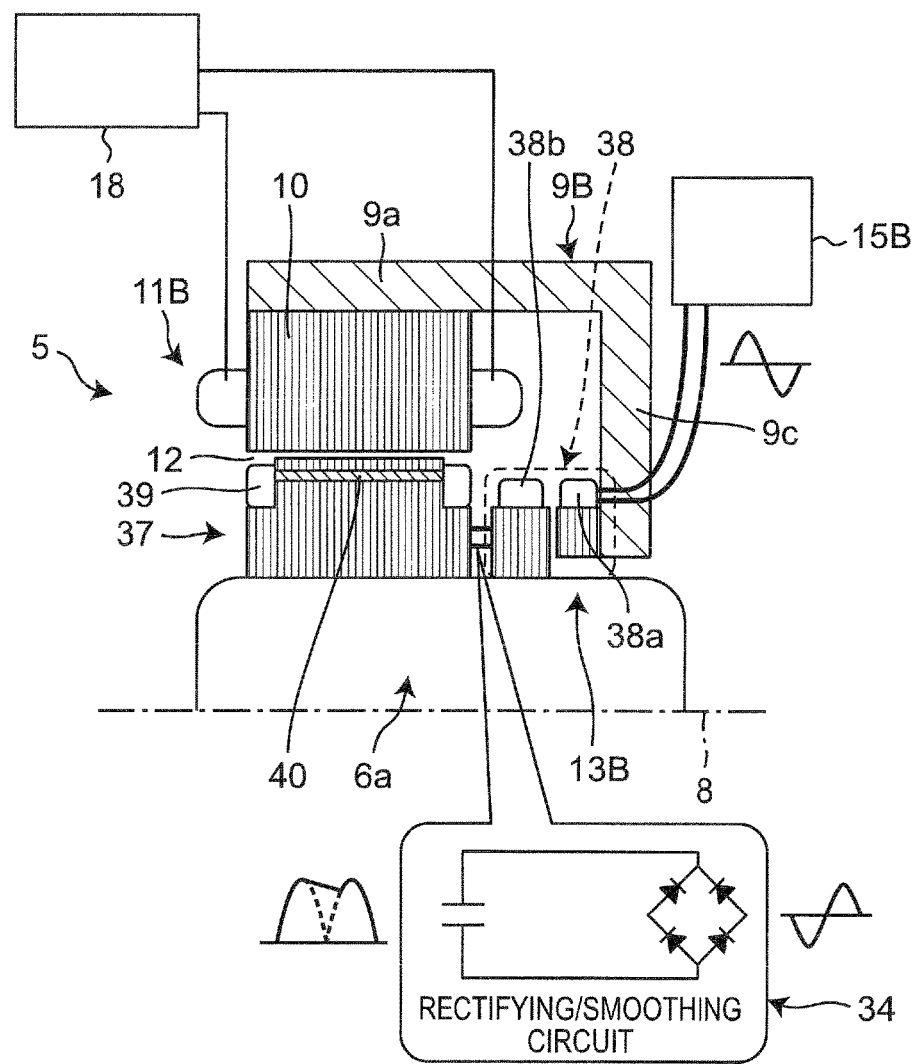
FIG. 11 is an explanatory view showing a component such as a rotating electrical machine as a half cross section with respect to a rotating shaft in another example of the power transmission apparatus provided with the rotating electrical machine according to the second embodiment of the present disclosure.

Meanwhile, as shown in FIGS. 10A, 10C, and 10D, the induction coil 38 is made up of a primary coil (an annular induction coil on the fixed side) 38a and a secondary coil (an annular induction coil on the rotating side) 38b.

As compared with the fixing member 9 of the first embodiment, a fixing member 9B of the second embodiment is not provided with the inner cylindrical portion 9b, but is made up of the outer cylindrical portion 9a and an annular plate portion 9c, and fixed with the primary coil 38a at the inner-center-side edge of the annular plate portion 9c. A gap is provided between the outer shell of the torque converter 6a and each of the annular plate portion 9c and the primary coil 38a. The primary coil 38a on the fixed side is supplied with electric energy such as an alternating current from the current control unit 15B, for example.

The secondary coil 38b is directly fixed to the outer shell of the torque converter 6a on the downstream side of the rotor 37 while facing the primary coil 38a on the fixed side with a gap therebetween, and rotates integrally with the rotor 37 around the rotating shaft 8. The secondary coil 38b is electrically connected to the field coil 39 of the rotor 37 via the rectifying circuit 33. Hence, an alternating current is generated in the secondary coil 38b on the rotating side by mutual inductive action between the primary coil 38a on the fixed side and the secondary coil 38b on the rotating side, and the rectifying circuit 33 rectifies the generated alternating current, and then supplies the rectified current to the field coil 39.

In this manner, the induction coil 38 supplies a current to the field coil 39 from the secondary coil 38b on the rotating side by the mutual inductive action that occurs between the primary coil 38a on the fixed side and the secondary coil 38b on the rotating side.

Hence in the start mode, as one example, the power transmission apparatus control unit 16 drives the inverter 18 based on the start command for the engine 2 to allow a current to flow in the stator 10 and magnetize the stator 10, in a similar manner to the first embodiment. Simultaneously with this, under control of the power transmission apparatus control unit 16, the current control unit 15B supplies a current to the primary coil 38a while changing the current that is supplied to the primary coil 38a. Then, the magnetic field in the primary coil 38a changes, and influenced thereby, electromagnetic induction occurs in the secondary coil 38b, and a current is generated in the secondary coil 38b on the rotating side. The rectifying circuit 33 rectifies the current generated in the secondary coil 38b on the rotating side, and thereafter supplies the rectified current to the field coil 39. The field coil 39 is excited when supplied with the current, and the rotor 37 rotates, to generate an inductive voltage in the stator 10.

In the second embodiment, with the above configuration, the electric energy is supplied from the current control unit 15B to the rotor 37 of the rotating electrical machine 11B in a non-contact manner through use of the principle of the mutual induction of the induction coil 38. Then, the magnetizing force of the field coil 39 provided in the rotor 37 is adjusted through the rectifying circuit 33 or the rectifying/smoothing circuit 34. The magnetizing force of the field coil 39 is adjusted based on the current control unit 15B in each of the power generation mode, the engine start mode, and the vehicle drive assist mode, in a similar manner to the first embodiment.

Note that the permanent magnet 40 may be omitted when there is no need to dispose the permanent magnet 40 in the field coil 39 and assist the magnetizing force of the field coil 39.

According to the second embodiment, an operation and effect similar to that of the first embodiment can be exerted. Further, the apparatus may simply be assembled with only one gap 12 held outside the rotor 37 in the second embodiment, whereas the apparatus needs to be assembled with the first gap 12 and the second gap 21 held respectively outside and inside the rotor 7 in the first embodiment. Hence the apparatus can be more easily assembled in the second embodiment than in the first embodiment.

<Third Embodiment>

In a third embodiment, there is provided a magnetizing force adjustment device 13C having a configuration slightly different from that of the magnetizing force adjustment device 13B of the second embodiment. Specifically, as shown in FIGS. 12A to 12D, the magnetizing force adjustment device 13C is provided with the field coil 39 and the permanent magnet 40 on the rotor side in the rotor 37 of the rotating electrical machine 11B in a similar manner to the second embodiment. Meanwhile, in place of the induction coil 38, the magnetizing force adjustment device 13C is provided with a plurality of plate-shaped permanent magnet 46a on the fixed side, and an auxiliary coil 45 for supplying electric energy such as a current to the field coil 39. The magnetizing force adjustment device 13C is further provided with the rectifying circuit 33 or the rectifying/smoothing circuit 34, a permanent magnet position-adjustment device 44 that performs position-adjustment of the permanent magnet 46a on the fixed side of the auxiliary coil 45, and a current control unit 15C that serves as still another example of the magnetizing force adjustment control unit and corresponds to the current control unit 15 of the first embodiment.

As compared with the fixing member 9B of the second embodiment, a fixing member 9C of the third embodiment is made up of the outer cylindrical portion 9a that is long in the axial direction of the rotating shaft 8, and an annular plate portion 9c, and the permanent magnet position-adjustment device 44 is fixed to the inner-center-side edge of the annular plate portion 9c along the axial direction of the rotating shaft 8. The permanent magnet position-adjustment device 44 has a driving shaft 44a that can be moved forward and backward, and a movable unit 46 including inside the permanent magnet 46a on the fixed side is fixed to the upstream-side end of the driving shaft 44a. As one example of the shape and disposition of the permanent magnet 46a on the fixed side, there can be considered an example in which a plurality of circular arc permanent magnets 46a are disposed with intervals in the peripheral direction in a vertical sectional shape orthogonal to the axial direction of the rotating shaft 8, an example in which a plurality of flat permanent magnets 46a are disposed with intervals on the peripheral direction, and the like. The permanent magnet position-adjustment device 44 is made up of a moving mechanism which moves the driving shaft 44a forward and backward in the axial direction by liquid pressure such as oil pressure, gas pressure such as pneumatic pressure, or centrifugal force, or made up of a mechanism such as an electric actuator which moves the driving shaft 44a forward and backward in the axial direction. An amount by which the driving shaft 44a is moved forward and backward in the axial direction, i.e., a movement amount of the permanent magnet 46a, is controlled by supply of electric energy such as a current from the current control unit 15C to the permanent magnet position-adjustment device 44.

Figure 12A:
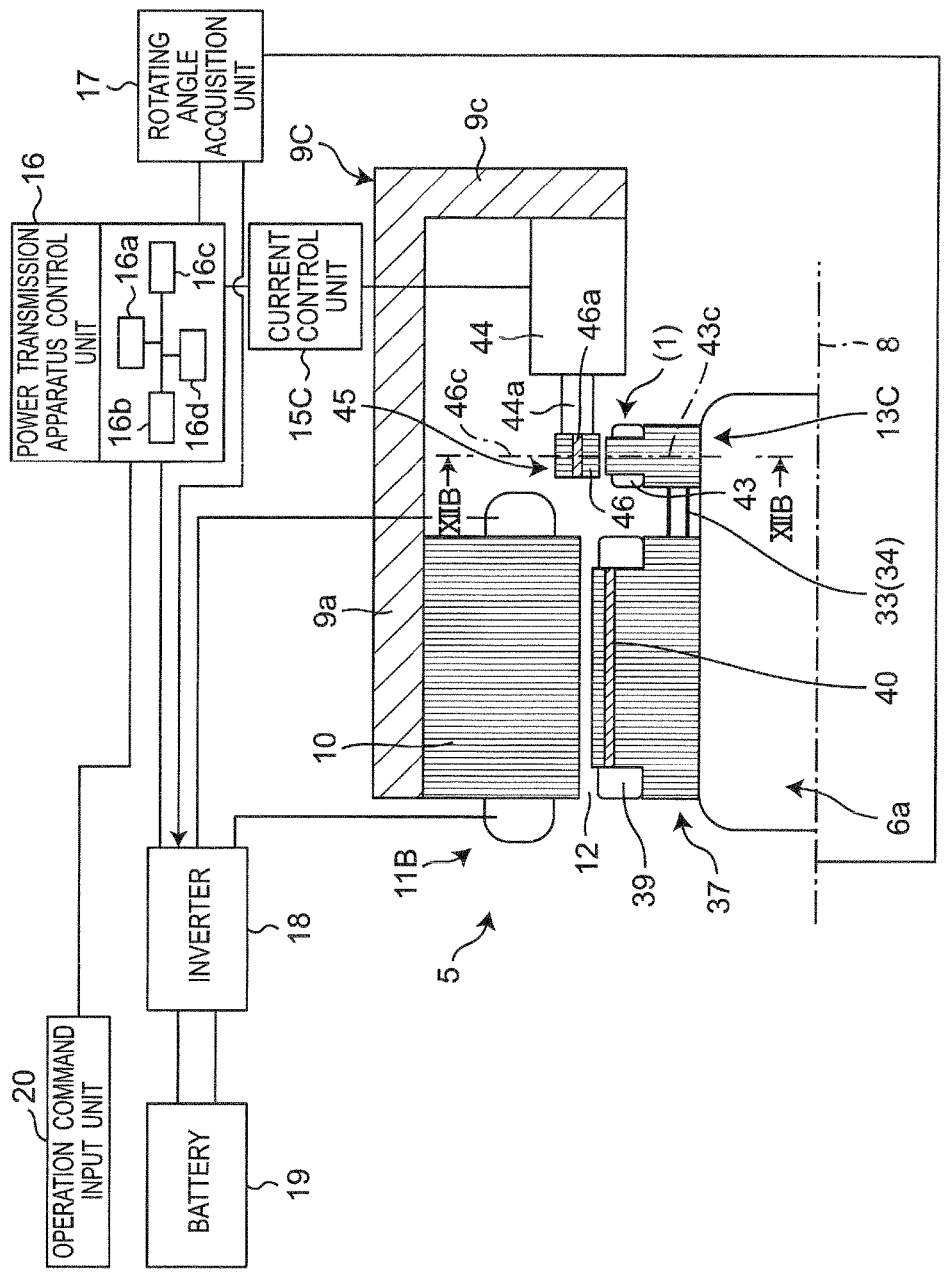
FIG. 12A is an explanatory view showing a component such as a rotating electrical machine as a half cross section with respect to a rotating shaft in one example of a power transmission apparatus provided with a rotating electrical machine according to a third embodiment of the present disclosure at the time when a deviation amount in position-adjustment is the smallest.
Figure 12B:
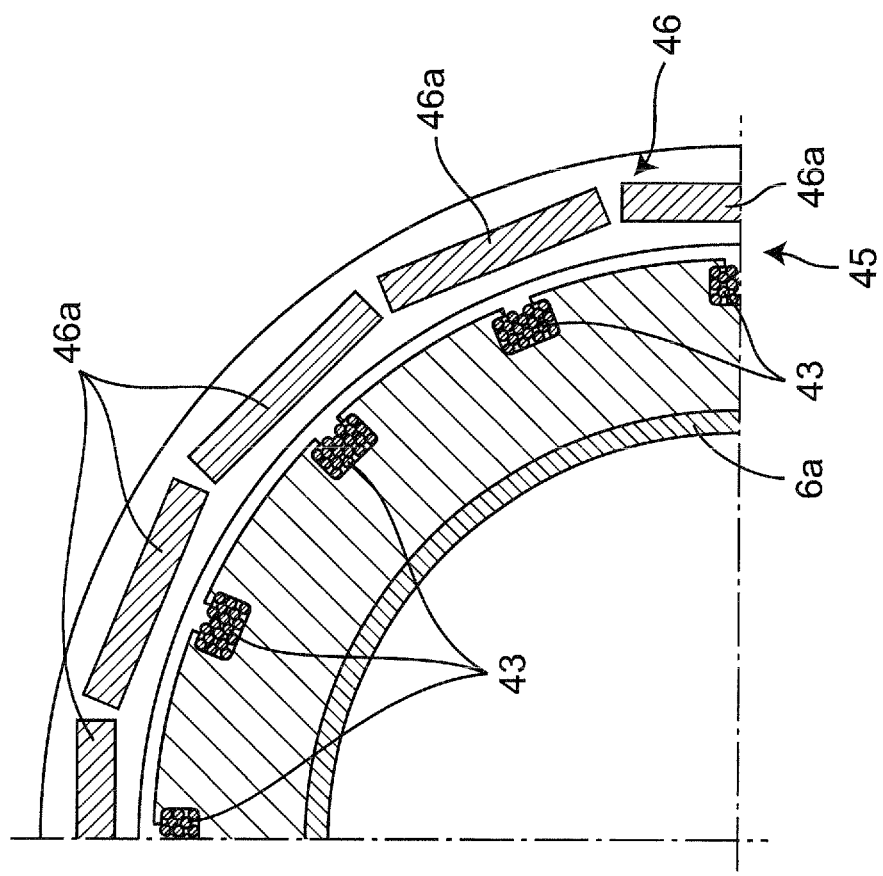
FIG. 12B is a sectional view showing part of a cross section along line XIIB-XIIB of FIG. 12A in the power transmission apparatus of FIG. 12A.
Figure 12C:
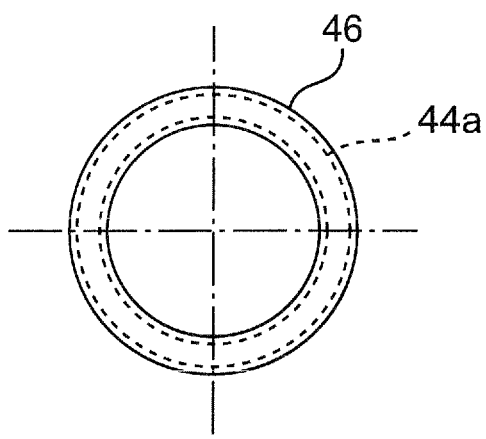
FIG. 12C is an explanatory view showing an example of disposition of a permanent magnet position-adjustment device in the power transmission apparatus of FIG. 12A.
Figure 12D:
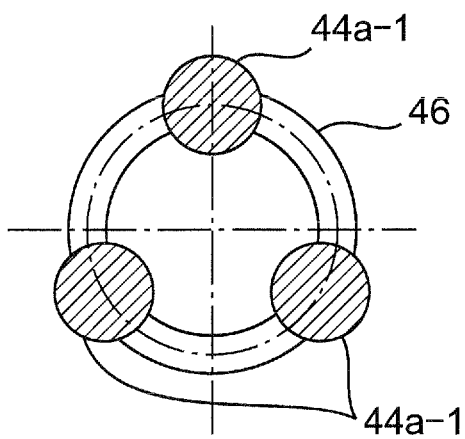
FIG. 12D is an explanatory view showing another example of disposition of the permanent magnet position-adjustment device in the power transmission apparatus of FIG. 12A.

The number of permanent magnet position-adjustment devices 44 to be disposed may be one or more than one. As one example of the disposition configuration of the permanent magnet position-adjustment device 44, as shown in FIG. 12C, one permanent magnet position-adjustment device 44 includes a cylindrical driving shaft 44a in a forwardly and backwardly movable manner, and one annular ring with a plurality of permanent magnets 46a disposed along the peripheral direction is fixed to the tip of the cylindrical driving shaft 44a, to enable the plurality of permanent magnets 46a to integrally move forward and backward in the axial direction of the driving shaft 44a. As another example of the disposition configuration of the permanent magnet position-adjustment device 44, as shown in FIG. 12D, three permanent magnet position-adjustment devices 44 are disposed along the periphery, each of the permanent magnet position-adjustment devices 44 includes a columnar driving shaft 44a-1 in a forwardly and backwardly movable manner, and one annular ring with a plurality of permanent magnets 46a disposed along the peripheral direction is fixed to the tip of the columnar driving shaft 44a. As a result, by synchronously driving the three permanent magnet position-adjustment devices 44, the three columnar driving shafts 44a-1 can be integrally moved forward and backward, and the plurality of permanent magnets 46a may be integrally moved forward and backward in the axial direction of the driving shaft 44a-1.

Figure 12E:
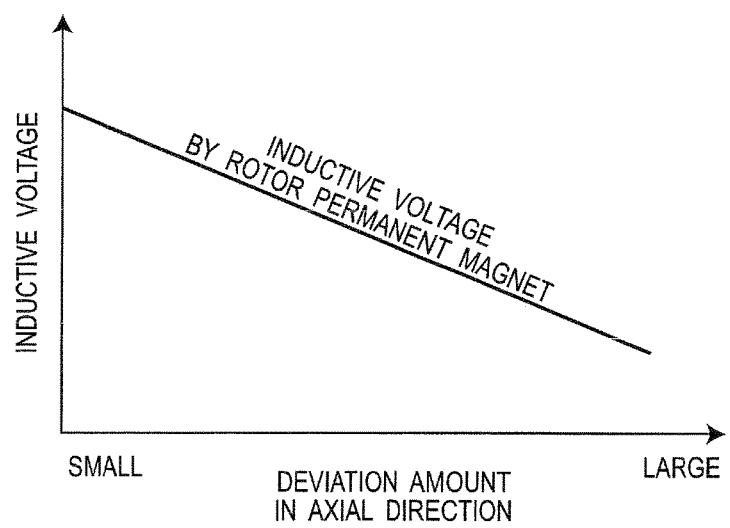
FIG. 12E is a graph for describing one example of position-adjustment in the permanent magnet position-adjustment device in the power transmission apparatus of FIG. 12A.

FIG. 12E shows a graph representing one example of the relation between a positional deviation amount and an inductive voltage. When conditions of the rotating speed, the current, and the like are the same, the inductive voltage is decided based only on an armature interlinkage magnetic flux generated by the permanent magnet 46a. Assuming that the armature interlinkage magnetic flux generated by the permanent magnet 46a is uniform in the axial direction, the positional deviation amount and the magnetic flux can be considered to have a proportional relation as shown in FIG. 12E. Therefore, based on this proportional relation, the permanent magnet position-adjustment device 44 may simply adjust the position of the permanent magnet 46a.

A coil 43 is directly fixed to the outer shell of the torque converter 6a on the downstream-side end of the rotor 37 while facing the permanent magnet 46a on the fixed side with a gap therebetween. The coil 43 thus rotates integrally with the rotor 37 around the rotating shaft 8. The coil 43 is electrically connected to the field coil 39 of the rotor 37 via the rectifying circuit 33 or the rectifying/smoothing circuit 34.

Accordingly, based on the current supplied from the current control unit 15C to the permanent magnet position-adjustment device 44, the permanent magnet position-adjustment device 44 changes the position of the permanent magnet 46a on the fixed side with respect to the coil 43 of the permanent magnet 46a on the fixed side along the axial direction of the rotating shaft 8. Then, a density of the magnetic flux generated by the permanent magnet 46a on the fixed side with respect to the coil 43 on the rotating side changes, and influenced thereby, the AC current generated in the coil 43 changes. The AC current generated in the coil 43 is rectified in the rectifying circuit 33 or the rectifying/smoothing circuit 34, and thereafter supplied to the field coil 39. The field coil 39 is excited when supplied with the current, and the rotor 37 rotates, to generate an inductive voltage in the stator 10. In this manner, the auxiliary coil 45 causes inductive power to be generated in the coil 43 on the rotating side by the permanent magnet 46a on the fixed side, and supplies a current based on the inductive power from the coil 43 on the rotating side to the field coil 39.

Note that FIGS. 12A, 13, 14, and 15 respectively show: a state (1) where an amount of deviation in the axial direction between the permanent magnet 46a on the fixed side and the coil 43 in the position-adjustment performed by the permanent magnet position-adjustment device 44 is the smallest; a state (2) where the deviation amount is slightly large; a state (3) where the deviation amount is large; and a state (4) where the deviation amount is the largest.

The permanent magnet 46a on the fixed side supported by the permanent magnet position-adjustment device 44 faces the coil 43 with a gap therebetween, and the position-adjustment of the permanent magnet 46a is performed with respect to the coil 43 along the axial direction of the rotating shaft 8. Thereby, an increase in inductive voltage accompanied by a rise in rotating speed of the rotor 37 can be reduced by rectifying the inductive voltage generated in the coil 43 on the rotating side by the permanent magnet 46a on the fixed side, and supplying the rectified voltage to the field coil 39 to magnetize the field coil 39. The magnetic force of the magnetized field coil 39 is caused to act in a direction to weaken the magnetic force of the permanent magnet 40 of the rotor to reduce the inductive voltage generated in the coil of the stator 10. That is, it is configured such that the permanent magnet position-adjustment device 44 adjusts the relative positional relation between the coil 43 and the permanent magnet 46a on the fixed side, to adjust a current that is supplied from the coil 43 to the field coil 39, and thereby adjust the magnetizing force of the field coil 39.

Figure 15:
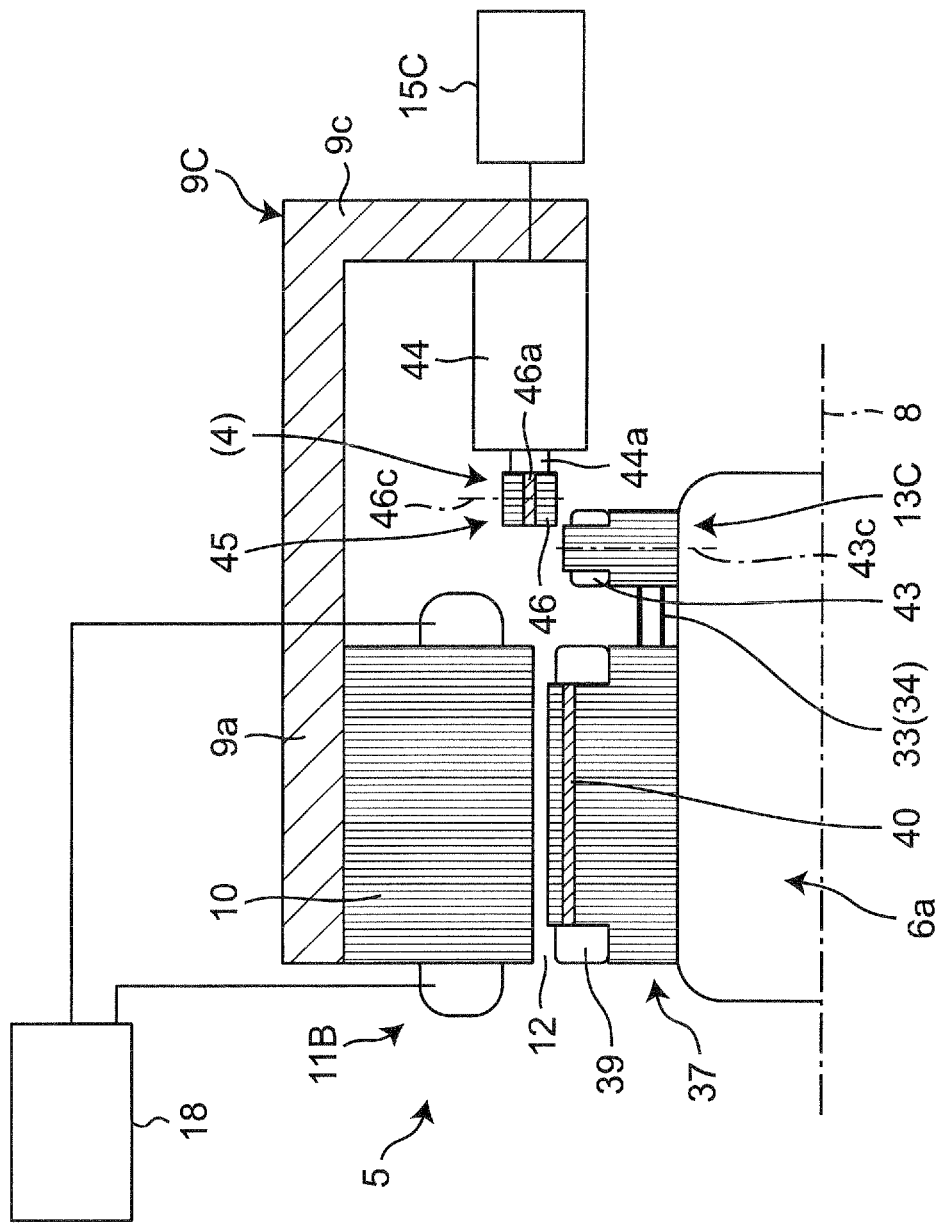
FIG. 15 is an explanatory view showing the components such as the rotating electrical machine as a half cross section with respect to the rotating shaft in one example of the power transmission apparatus provided with the rotating electrical machine according to the third embodiment of the present disclosure at the time when the deviation amount in position-adjustment is the largest.
Figure 16:
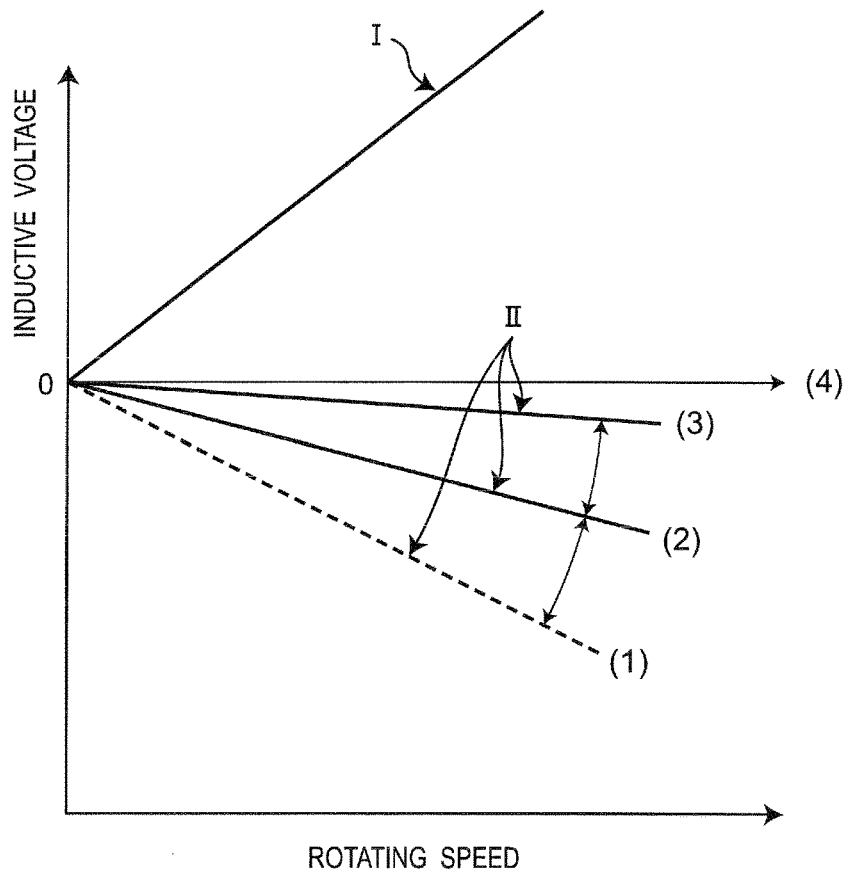
FIG. 16 is a graph of an inductive voltage generated in a stator coil by a permanent magnet on the rotor side, and a graph of an inductive voltage generated in an auxiliary coil.
Figure 17:
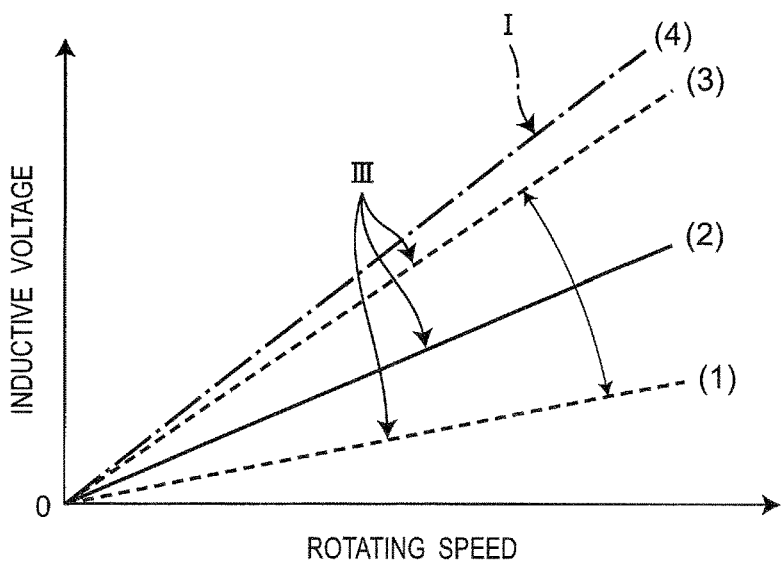
FIG. 17 is a graph of an inductive voltage generated in the stator coil by applying, to a field coil, inductive voltages generated in the permanent magnet on the rotor side and the auxiliary coil.

This is specifically described with reference to FIGS. 16 and 17. FIG. 16 shows a graph I of an inductive voltage generated in the permanent magnet 40 on the rotor side, and a graph II of an inductive voltage generated in the auxiliary coil 45. Since the inductive voltage generated in the permanent magnet 40 on the rotor side (cf. graph I) and the inductive voltage generated in the auxiliary coil 45 (cf. graph II) have opposite signs from each other, FIG. 16 respectively show the positive side and the negative side, taking as a border a horizontal axis (4) at the time of the inductive voltage being 0. FIG. 17 shows a graph III of an inductive voltage generated in the stator 10 by applying to the field coil 39 the inductive voltages generated in the permanent magnet 40 on the rotor side and the auxiliary coil 45. In FIGS. 16 and 17, (1), (2), (3), and (4) in the graph II and the graph III respectively show the following states of FIGS. 12A, 13, 14, and 15: a state (1) where an amount of deviation in the axial direction between the permanent magnet 46a on the fixed side and the coil 43 in the position-adjustment performed by the permanent magnet position-adjustment device 44 is the smallest; a state (2) where the deviation amount is slightly large; a state (3) where the deviation amount is large; and a state (4) where the deviation amount is the largest. This means that the inductive voltage in the graph III of FIG. 17 is smaller than the inductive voltage in the graph I which is generated in the permanent magnet 40 on the rotor side of FIG. 16.

These figures indicate that the inductive voltage generated on the stator side is the smallest in the state (1) where the deviation amount in the axial direction between the permanent magnet 46a on the fixed side and the coil 43 is the smallest. Here, the state where the deviation amount in the axial direction between the permanent magnet 46a on the fixed side and the coil 43 is the smallest is assumed to be, as one example, a state where a center line 46c of the permanent magnet 46a on the fixed side coincides with a center line 43c of the coil 43, as shown in FIG. 12A.

Figure 13:
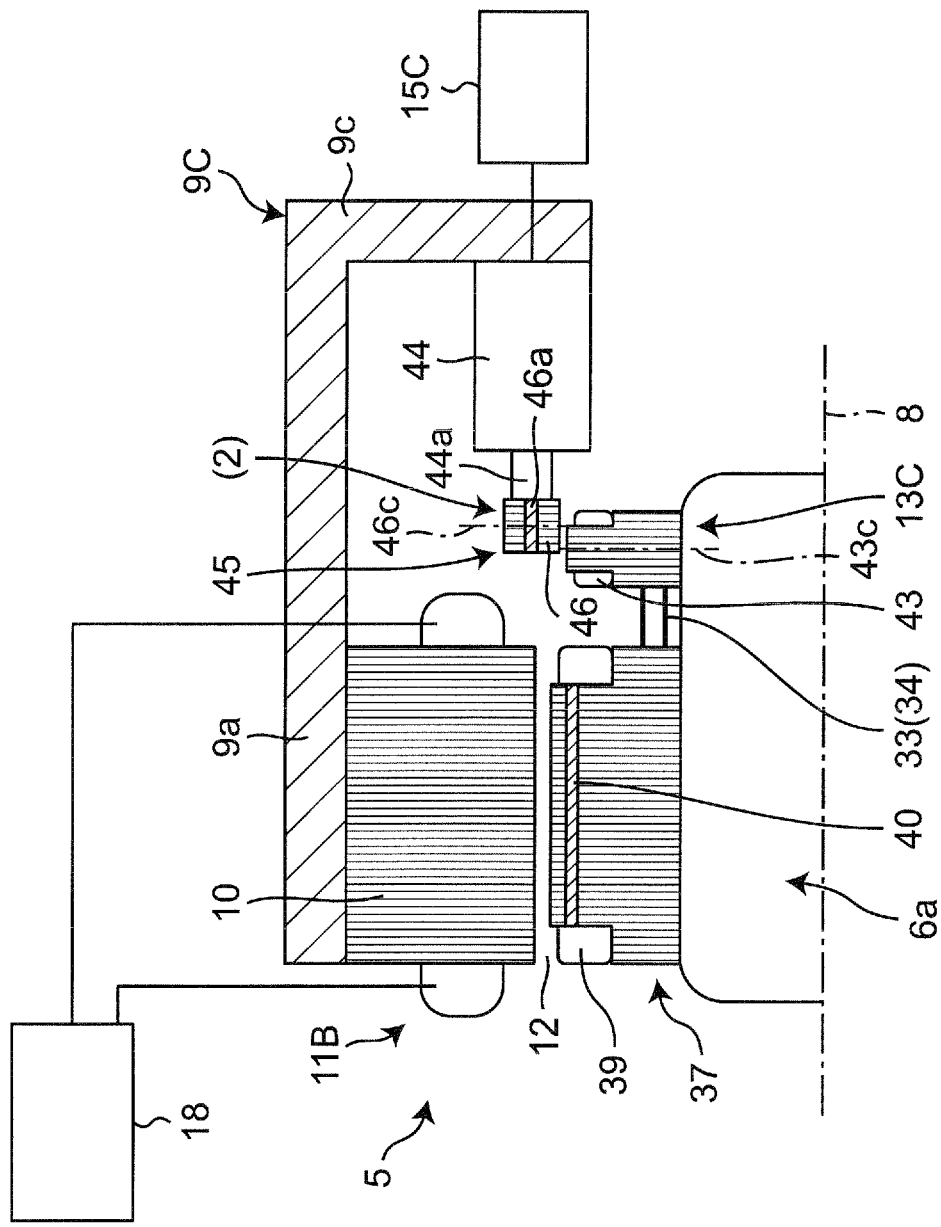
FIG. 13 is an explanatory view showing the components such as the rotating electrical machine as a half cross section with respect to the rotating shaft in one example of the power transmission apparatus provided with the rotating electrical machine according to the third embodiment of the present disclosure at the time when the deviation amount in position-adjustment is slightly large.

Further, it means that the inductive voltage generated on the stator side is slightly large in the state (2) where the deviation amount in the axial direction between the permanent magnet 46a on the fixed side and the coil 43 is slightly large. Here, the state where the deviation amount in the axial direction between the permanent magnet 46a on the fixed side and the coil 43 is slightly large is assumed to be, as one example, a state where the center line 46c of the permanent magnet 46a on the fixed side and the center line 43c of the coil 43 do not coincide with each other and are slightly deviated from each other, as shown in FIG. 13.

Figure 14:
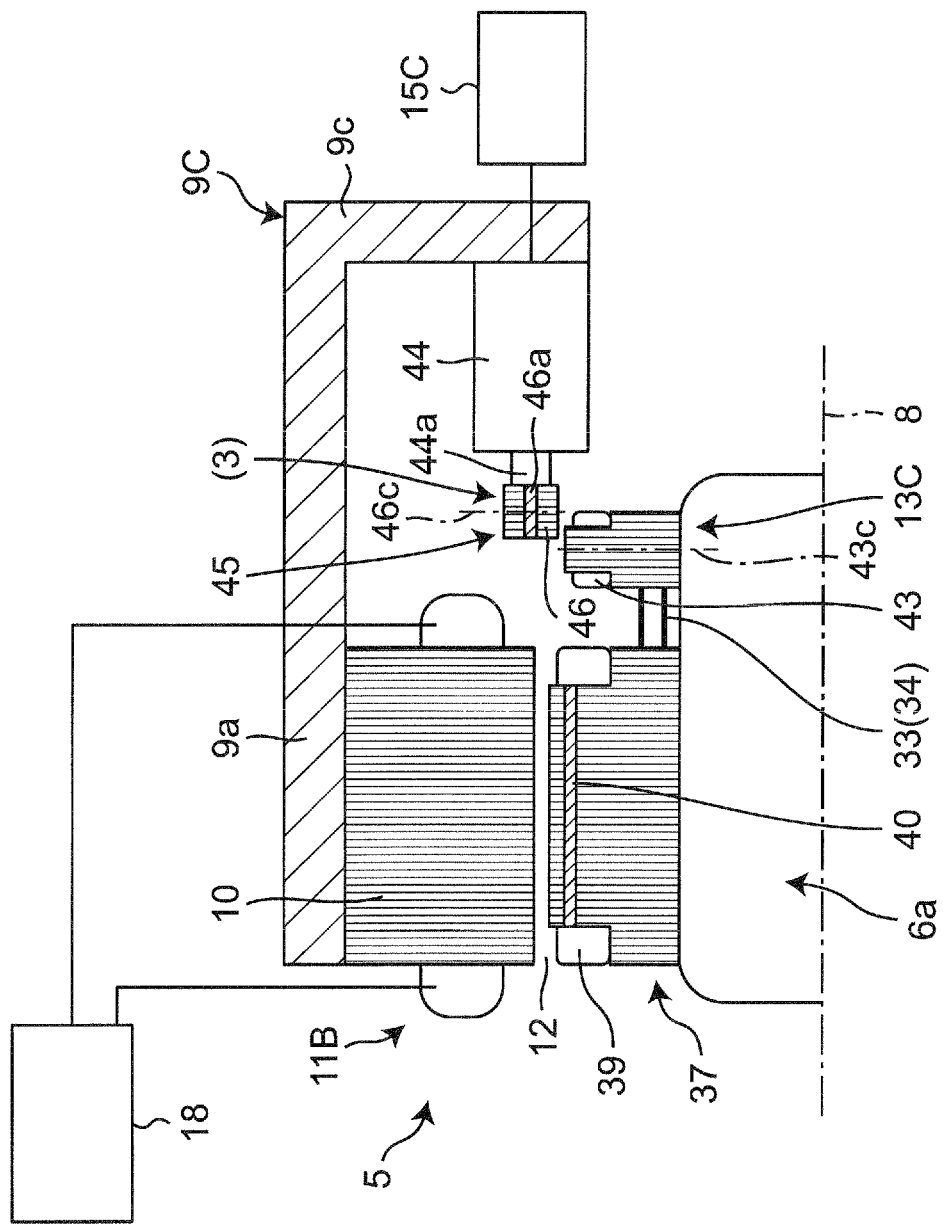
FIG. 14 is an explanatory view showing the components such as the rotating electrical machine as a half cross section with respect to the rotating shaft in one example of the power transmission apparatus provided with the rotating electrical machine according to the third embodiment of the present disclosure at the time when the deviation amount in position-adjustment is large.

Moreover, it means that the inductive voltage generated on the stator side is larger in the state (3) where the deviation amount in the axial direction between the permanent magnet 46a on the fixed side and the coil 43 is large. Here, the state where the deviation amount in the axial direction between the permanent magnet 46a on the fixed side and the coil 43 is large is assumed to be, as one example, a state where the center line 46c of the permanent magnet 46a on the fixed side and the center line 43c of the coil 43 do not coincide with each other and are greatly deviated from each other, as shown in FIG. 14.

It means that the inductive voltage generated on the stator side is the largest in the state (4) where the deviation amount in the axial direction between the permanent magnet 46a on the fixed side and the coil 43 is the largest. Here, the state where the deviation amount in the axial direction between the permanent magnet 46a on the fixed side and the coil 43 is the largest is assumed to be, as one example, a state where the center line 46c of the permanent magnet 46a on the fixed side and the center line 43c of the coil 43 do not coincide with each other and are most greatly deviated from each other, as shown in FIG. 15.

In this manner, the inductive voltage can be controlled by adjusting the deviation amount in the axial direction between the permanent magnet 46a on the fixed side and the coil 43.

Hereinafter, operation in each mode is described as one example.

(a) Engine Start Mode

Based on a start command for the engine 2, under control of the power transmission apparatus control unit 16, the permanent magnet position-adjustment device 44 performs position-adjustment of the permanent magnet 46a on the fixed side by the current control unit 15C, to enter the state (4) of FIG. 15. When the power transmission apparatus control unit 16 then drives the inverter 18 to allow a current to flow in the stator 10 and then magnetize the stator 10, the rotor 7 including the permanent magnet 40 on the rotor side starts rotating with respect to the stator 10. Note that the position-adjustment of the permanent magnet 46a on the fixed side may be performed simultaneously with the rotation of the rotor 7.

The largest amount of power is generated in the state (4) of FIG. 15 as to the relation between the position-adjustment of the permanent magnet 46a on the fixed side and the distance between the permanent magnet 46a on the fixed side and the coil 43, namely, in a state where the permanent magnet 46a on the fixed side and the coil 43 on the corresponding side do no overlap. The engine start mode is started in the state (4) where the power generation amount is large as thus described. When the rotating speed rises from the start of the engine start mode and reaches the rotating speed Nmin at initial explosion, the mode is shifted to the power generation mode and remains in this mode thereafter.

(b) Power Generation Mode

When the rotating speed is the rotating speed Nmin at initial explosion or higher, the position of the permanent magnet 46a on the fixed side with respect to the coil 43 is adjusted by the permanent magnet position-adjustment device 44 under control of the power transmission apparatus control unit 16 so as to make the inductive voltage constant.

Figure 18:
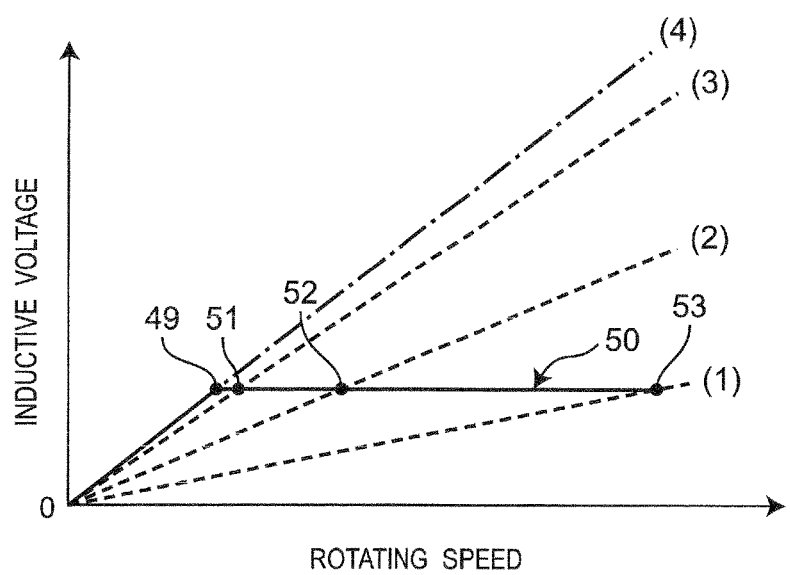
FIG. 18 is a graph of one example of a relation between the inductive voltage and the number of rotations.

Specifically, under control of the power transmission apparatus control unit 16, in the process of rise of the rotating speed, the current control unit 15C controls the permanent magnet position-adjustment device 44 so as to successively move the position of the permanent magnet 46a on the fixed side with respect to the coil 43 from the state (4) to the state (3), from the state (3) to the state (2), and from the state (2) to the state (1) (namely, from the state of FIG. 15 to the state of FIG. 14, from the state of FIG. 14 to the state of FIG. 13, and from the state of FIG. 13 to the state of FIG. 12A). In order to make the inductive voltage constant by position-adjustment of the permanent magnet 46a on the fixed side as thus described, the power generation amount is controlled so as to gradually decrease in accordance with the rotating speed. As indicated by a solid line 50 in FIG. 18, the shift of the state (4) to the state (1) means that the state is laterally slid from the state (4), through the state (3) and the state (2), to the state (1). In this solid line 50 of FIG. 18, for example, when the rotating speed is at a first folding point 49 on the left of the solid line 50, the inductive voltage is the highest in the state (4), and is higher in the order of the state (3), the state (2), and the state (1). In performing the position-adjustment as indicated by the solid line 50 such that the inductive voltage is in a constant state, if the position-adjustment is not performed despite an increase in the number of rotations, the inductive voltage deviates from the solid line 50 and increases along the graph of a dotted line of the state (4) after the first folding point 49. By performing the position-adjustment such that the inductive voltage is in the constant state even after the first folding point 49, when the number of rotations increases, the control is performed so as not to increase the inductive voltage along the graph of the state (4) but to shift the inductive voltage to a second point 51 and subsequently to a third point 52 along the solid line 50. Further, by performing the position-adjustment such that the inductive voltage is in the constant state even after the point 52, when the number of rotations increases, the control is performed so as not to increase the inductive voltage along the graph of the state (4), (3), or (2) but to shift the inductive voltage to a fourth point 53 along the solid line 50.

As thus described, in the power generation mode and the start mode, the rotating speed is detected while the inductive voltage is held constant, and the position-adjustment may simply be performed so as to automatically slide the inductive voltage on the solid line 50 based on the detected rotating speed.

(c) Vehicle Drive Assist Mode

In this mode, since there is no need to limit the inductive voltage, the control is performed irrespective of the inductive voltage by performing the position-adjustment so as to shift the state between the state (4) and the state (3), between the state (3) and the state (2), or between the state (2) and the state (1) in accordance with the rotating speed based on the program having been previously set, for example, for improving the fuel efficiency and stored into the power transmission apparatus control unit 16.

According to the third embodiment, an operation and effect similar to that of the first embodiment can be exerted, and further, the apparatus is assembled with only one gap 12 held on the outside of the rotor 37 in the third embodiment, whereas the apparatus needs to be assembled with the first gap 12 and the second gap 21 held respectively on the outside and the inside of the rotor 7 in the first embodiment. Thus, the assembly can be easily performed in the third embodiment as compared with the first embodiment.

Note that proper combination of embodiment(s) or modified example(s) arbitrary selected out of the above variety of embodiments or examples can exert the effects of the respective embodiments or examples. While combination of embodiments, combination of examples, or combination of an embodiment and an example is possible, combination of characteristics of different embodiments or examples is also possible.

The power transmission apparatus with the rotating electrical machine according to the present disclosure can reliably transmit rotation driving force of the rotating electrical machine to the internal combustion engine even in a cold state, and reliably start the internal combustion engine in the cold state, and is useful as a power transmission apparatus for an automobile and the like.

What is claimed is:

1. A power transmission apparatus with a rotating electrical machine, the apparatus being disposed on a power transmission path from an output shaft of an internal combustion engine to a transmission in a vehicle, the apparatus comprising:

a rotating electrical machine that includes:
  a rotor coupled to a synchronous rotating member that rotates synchronously with the output shaft of the internal combustion engine, a rotating shaft defining a central axis of the output shaft of the internal combustion engine;
  a stator fixed to a fixing member on a non-rotating side with respect to the synchronous rotating member, and facing the rotor with a first gap therebetween;
a magnetizing force adjustment device that adjusts magnetizing force of the rotor so as to be different between at a start of the internal combustion engine and at a time of power generation, the magnetizing force adjustment device including:
  a field coil that applies magnetizing force to the rotor to excite the rotor, and
  a magnetizing force adjustment control unit that controls electric energy that is supplied to the field coil, to adjust the magnetizing force that is generated in the field coil, the magnetizing force adjustment device controlling electric energy that is supplied from the magnetizing force adjustment control unit to the field coil so as to be different between at the start of the internal combustion engine and at the time of power generation, to make the magnetizing force of the rotor different and make an inductive voltage that is generated in the stator different between at the start of the internal combustion engine and at the time of power generation, an inverter electrically connected to the stator; and a power transmission apparatus control unit that distinguishes the start of the internal combustion engine and the time of power generation and controls drive of each of the inverter and the magnetizing force adjustment control unit, wherein:

the rotor of the rotating electrical machine has a cylindrical shape, and a first claw pole and a second claw pole face each other in a form of sandwiching a non-magnetic body in a vertical cross section along an axial direction of the rotating shaft of the rotor, and first claw pole and second claw pole, each formed of a magnetic body, are alternately disposed along a peripheral direction of the rotor, the stator is disposed in a cylindrical shape on a radially outer side of the rotor with the first gap therebetween, and the field coil of the magnetizing force adjustment device is fixed to the fixing member on the non-rotating side with a second gap between the rotor and the field coil, and applies magnetizing force to the rotor disposed in a non-contact manner, to excite the first claw pole and the second claw pole each being the magnetic body of the rotor.

2. The power transmission apparatus with a rotating electrical machine according to claim 1, wherein the synchronous rotating member is either an outer shell of a friction clutch or a flywheel coupled to an internal-combustion-engine side of the friction clutch.

3. The power transmission apparatus with the rotating electrical machine according to claim 1, wherein the synchronous rotating member is either an outer shell of a torque converter or a drive plate coupled to an internal-combustion-engine side of the torque converter.

4. The power transmission apparatus with a rotating electrical machine according to claim 1, wherein the synchronous rotating member is either an outer shell of a fluid coupling or a drive plate coupled to an internal-combustion-engine side of the fluid coupling.

5. The power transmission apparatus with a rotating electrical machine according to claim 1, wherein:

the rotor of the rotating electrical machine includes a permanent magnet in place of the non-magnetic body.

6. The power transmission apparatus with a rotating electrical machine according to claim 5, wherein a permanent magnet is provided in a core of the field coil in the rotor of the rotating electrical machine.

7. A power transmission apparatus with a rotating electrical machine, the apparatus being disposed on a power transmission path from an output shaft of an internal combustion engine to a transmission in a vehicle, the apparatus comprising:

a rotating electrical machine that includes:

a rotor coupled to a synchronous rotating member that rotates synchronously with the output shaft of the internal combustion engine, a rotating shaft defining a central axis of the output shaft of the internal combustion engine;

a stator fixed to a fixing member on a non-rotating side with respect to the synchronous rotating member, and facing the rotor with a first gap therebetween;

a magnetizing force adjustment device that adjusts magnetizing force of the rotor so as to be different between at a start of the internal combustion engine and at a time of power generation, the magnetizing force adjustment device including:

a field coil that applies magnetizing force to the rotor to excite the rotor, and a magnetizing force adjustment control unit that controls electric energy that is supplied to the field coil, to adjust the magnetizing force that is generated in the field coil, the magnetizing force adjustment device controlling electric energy that is supplied from the magnetizing force adjustment control unit to the field coil so as to be different between at the start of the internal combustion engine and at the time of power generation, to make the magnetizing force of the rotor different and make an inductive voltage that is generated in the stator different between at the start of the internal combustion engine and at the time of power generation, an inverter electrically connected to the stator; and a power transmission apparatus control unit that distinguishes the start of the internal combustion engine and the time of power generation and controls drive of each of the inverter and the magnetizing force adjustment control unit, wherein:

the field coil is provided in the rotor of the rotating electrical machine, the magnetizing force adjustment device includes an induction coil made up of a primary coil on a fixed side which is fixed to the fixing member where the stator is fixed, and supplied with the electric energy that is supplied from the magnetizing force adjustment control unit to the field coil, and a secondary coil on a rotating side which is coupled to the synchronous rotating member and makes a same rotation as the rotor, and a rectifying circuit that is interposed between the secondary coil of the induction coil and the field coil of the rotor, and rectifies a current that is supplied from the secondary coil to the field coil, and the electric energy that is supplied from the magnetizing force adjustment control unit to the field coil is supplied to the field coil via the primary coil, the secondary coil, and the rectifying circuit.

8. The power transmission apparatus with a rotating electrical machine according to claim 7, the apparatus comprising a rectifying/smoothing circuit that is interposed between the secondary coil and the field coil in place of the rectifying circuit, and rectifies and smooths the current that is supplied from the secondary coil to the field coil.

9. The power transmission apparatus with a rotating electrical machine according to claim 8, the apparatus further comprising:

a permanent magnet on a fixed side which is disposed on the fixing member in place of the primary coil of the induction coil;

a coil on a rotating side which is coupled to the synchronous rotating member in place of the secondary coil of the induction coil, and makes the same rotation as the rotor; and a permanent magnet position-adjustment device that is electrically connected to the magnetizing force adjustment control unit and adjusts a relative positional relation of the permanent magnet on the fixed side with respect to the coil on the rotating side along the axial direction of the rotating shaft of the rotor, wherein the power transmission apparatus control unit causes the permanent magnet position-adjustment device, via the magnetizing force adjustment control unit, to make different the relative positional relation of the permanent magnet on the fixed side with respect to the coil on the rotating side along the axial direction of the rotating shaft of the rotor between at the start of the internal combustion engine and at the time of power generation, to control electric energy that is supplied from the coil on the rotating side to the field coil and make the magnetizing force that is generated in the field coil different between at the start of the internal combustion engine and at the time of power generation.

\* \* \* \* \*